US006424980B1

(12) United States Patent
Iizuka et al.

(10) Patent No.: US 6,424,980 B1
(45) Date of Patent: Jul. 23, 2002

(54) INTEGRATED RETRIEVAL SCHEME FOR RETRIEVING SEMI-STRUCTURED DOCUMENTS

(75) Inventors: Yuichi Iizuka, Yokohama; Mitsuaki Tsunakawa, Yokosuka; Toshihiro Nagasue, Yokohama; Takashi Hoshino, Yokosuka; Hiroki Machihara, Kawasaki, all of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/328,944

(22) Filed: Jun. 9, 1999

(30) Foreign Application Priority Data

| Jun. 10, 1998 | (JP) | 10-162648 |
| Aug. 3, 1998 | (JP) | 10-219365 |
| Apr. 2, 1999 | (JP) | 11-096183 |

(51) Int. Cl.$^7$ .................. G06F 15/00; G06F 17/21; G06F 17/30
(52) U.S. Cl. .................. 707/513; 707/3; 707/4
(58) Field of Search .................. 707/513, 3, 4, 707/9, 101, 5, 27, 104, 2; 713/201; 705/27, 14, 35; 345/348

(56) References Cited

U.S. PATENT DOCUMENTS 5,802,518 A * 9/1998 Karaev et al. .................. 707/9

(List continued on next page.)

FOREIGN PATENT DOCUMENTS

JP    10-187742    7/1998

OTHER PUBLICATIONS

Wen–Syan Li et al. WebDB: a Web query system and its modeling, language, and implementation, IEEE, Research and Technology Advances in Digital Libraries pp. 126–227, Apr. 1998.*

(List continued on next page.)

*Primary Examiner*—Joseph H. Feild
*Assistant Examiner*—William L. Bashore
(74) *Attorney, Agent, or Firm*—Kilpatrick Stockton LLP

(57) ABSTRACT

An integrated retrieval scheme retrieves data involved in a plurality of semi-structured documents scattering over open networks and collects the required information item by item from the semi-structured documents through a unified interface without regard to differences in the document structures, presentation styles, and elements of the semi-structured documents.

The search scheme receives a query consisting of search items and search conditions from a user. The search scheme finds, according to location data that specifies the location of each of the semi-structured documents, the location of each semi-structured document that contains all search items and converts, if necessary, item presentation styles of the entered query into that of the location found semi-structured documents according to style conversion data, and forms queries for the location found semi-structured documents, and transmits the queries to the found locations and obtains the location found semi-structured documents, and extracts item data from the obtained semi-structured documents according to structure data being used to delimit document into items and attribute data being used for conditional retrieval, and prepares a search result, and converts, if necessary, item presentation styles of the search result into the item presentation styles of each user according to the style conversion data.

30 Claims, 41 Drawing Sheets

U.S. PATENT DOCUMENTS

| | | | | |
|---|---|---|---|---|
| 5,826,258 A | * | 10/1998 | Gupta et al. | 707/4 |
| 5,873,076 A | * | 2/1999 | Barr et al. | 707/3 |
| 5,911,139 A | * | 6/1999 | Jain et al. | 707/3 |
| 5,913,205 A | * | 6/1999 | Jain et al. | 707/2 |
| 5,920,856 A | * | 7/1999 | Syeda-Mahmood | 707/3 |
| 5,933,816 A | * | 8/1999 | Zeanah et al. | 705/35 |
| 5,966,126 A | * | 10/1999 | Szabo | 345/348 |
| 5,987,446 A | * | 11/1999 | Corey et al. | 707/3 |
| 5,987,457 A | * | 11/1999 | Ballard | 707/5 |
| 5,995,943 A | * | 11/1999 | Bull et al. | 705/14 |
| 6,014,638 A | * | 1/2000 | Burge et al. | 705/27 |
| 6,018,733 A | * | 1/2000 | Kirsch et al. | 707/101 |
| 6,038,668 A | * | 3/2000 | Chipman et al. | 713/201 |
| 6,078,914 A | * | 6/2000 | Redfern | 707/3 |
| 6,081,774 A | * | 6/2000 | De Hita et al. | 704/9 |
| 6,185,573 B1 | * | 2/2001 | Angelucci et al. | 707/104 |

OTHER PUBLICATIONS

Adah, S. et al. Integrated Search Engine, IEEE, Knowledge and Data Engineering Exchange Workshop, pp. 140–147, Nov. 1997.*

Martin, P. et al. Using metadata to query passive data sources, IEEE, System Sciences, pp. 286–294 vol. 7, Jan. 1998.*

Ming–Hsuan Yang et al. A natural language processing based Internet agent, IEEE, Systems, Man, and Cybernetics, pp. 100–105 vol. 1, Oct. 1997.*

* cited by examiner

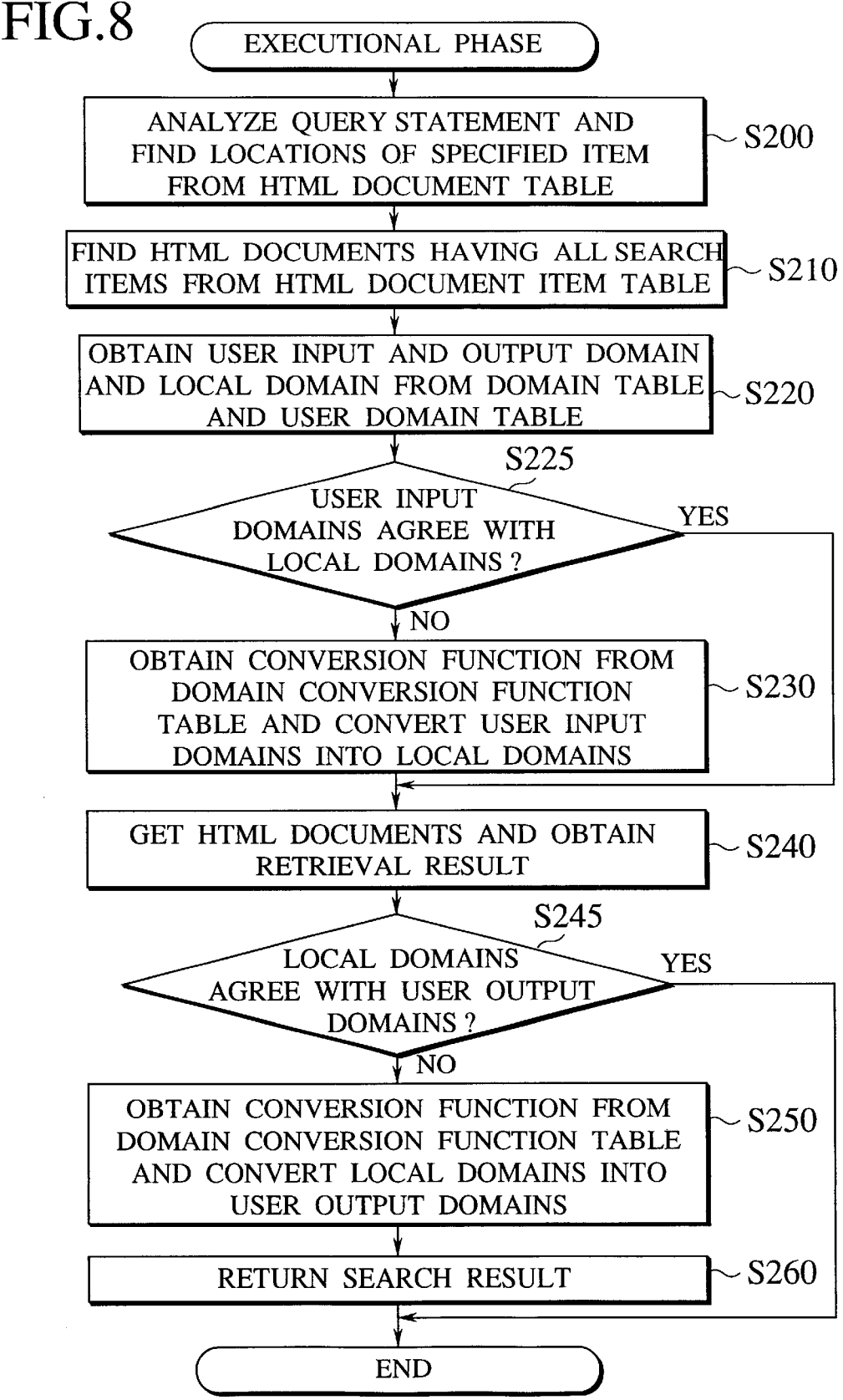

FIG.9A

EXEMPLARY DISPLAY BY WEB BROWSER
TITLE:SHOP A PRODUCT INFORMATION
URL:http://www.shop_a.co.jp/products.html

| PRODUCT INFORMATION | |
|---|---|
| PRODUCT NAME | PRICE |
| Maker A/PC1 | ¥170,000 |
| Maker A/PC2 | ¥238,000 |
| Maker B/PC101 | ¥198,000 |

FIG.9B

HTML DOCUMENT

```
<BODY>
  <H1>PRODUCT INFORMATION</H1>

<TABLE BORDER>
    <TR><TH>PRODUCT NAME</TH><TH>PRICE</TH></TR>
    <TR><TD>Maker   A/PC1</TD><TD>¥170,000</TD></TR>
    <TR><TD>Maker   A/PC2</TD><TD>¥238,000</TD></TR>
    <TR><TD>Maker   B/PC101</TD><TD>¥198,000</TD></TR>
  </TABLE>
</BODY>
```

FIG.10A

EXEMPLARY DISPLAY BY WEB BROWSER
TITLE:SHOP B PRODUCT INFORMATION
URL:http://www.shop_b.co.jp/shouhin.html

```
PRODUCT INFORMATION

MAKER NAME/PRODUCT NAME /PRICE
1. Maker   A/PC1/168,000YEN
2. Maker   B/PC101/208,000YEN
3. Maker   B/PC102/248,000YEN
```

FIG.10B

HTML DOCUMENT

```
<BODY>
  <H1>PRODUCT INFORMATION </H1>

<H3>MAKER NAME/PRODUCT NAME /PRICE </H3>
  <OL>
    <L1>Maker   A/PC1/168,000YEN
    <L1>Maker   B/PC101/208,000YEN
    <L1>Maker   B/PC102/248,000YEN
  </OL>
</BODY>
```

FIG.11

HTML DOCUMENT TABLE

| PAGE NAME | URL |
|---|---|
| Shop_A | http://www.shop_a.co.jp/products.html |
| Shop_B | http://www.shop_b.co.jp/shouhin.html |

FIG.12

HTML DOCUMENT TO TABLE MAPPING TABLE

| PAGE NAME | RECORD START | COLUMN 1 | COLUMN 2 | COLUMN 3 | COLUMN 4 |
|---|---|---|---|---|---|
| Shop_A | \<TR>\<TD> | SHOP A | BETWEEN 1ST \<TD> AND 1ST "/" IN RECORD START LINE | BETWEEN 1ST "/" AND 1ST \</TD> IN RECORD START LINE | BETWEEN 2ND "\<TD>" AND 2ND"\</TD>" IN RECORD START LINE |
| Shop_B | \<LI> | SHOP B | BETWEEN 1ST \<LI> AND 1ST "/" IN RECORD START LINE | BETWEEN 1ST "/" AND 2ND "/" IN RECORD START LINE | BETWEEN 2ND "/" AND 1ST "YEN" IN RECORD START LINE |

FIG.13

HTML DOCUMENT ITEM TABLE

| PAGE NAME | COLUMN | COLUMN TITLE | DATA TYPE | LOCAL DOMAIN |
|---|---|---|---|---|
| Shop_A | 1 | SHOP NAME | CHARACTER STRING | NONE |
| Shop_A | 2 | MAKER NAME | CHARACTER STRING | NONE |
| Shop_A | 3 | PRODUCT NAME | CHARACTER STRING | NONE |
| Shop_A | 4 | PRICE | NUMERIC VALUE | WITH - ¥ |
| Shop_B | 1 | SHOP NAME | CHARACTER STRING | NONE |
| Shop_B | 2 | MAKER NAME | CHARACTER STRING | NONE |
| Shop_B | 3 | PRODUCT NAME | CHARACTER STRING | NONE |
| Shop_B | 4 | PRICE | NUMERIC VALUE | VALUE AND " " |

FIG.14

DOMAIN TABLE

| DOMAIN GROUP | USER DOMAIN |
|---|---|
| PRICE | WITH - ¥ |
| PRICE | VALUE AND " " |
| PRICE | WITH - YEN |

FIG.15

USER DOMAIN TABLE

| USER NAME | DOMAIN GROUP | USER INPUT DOMAIN | USER OUTPUT DOMAIN |
|---|---|---|---|
| USER A | PRICE | WITH - YEN | WITH - YEN |

FIG.16

DOMAIN CONVERSION FUNCTION TABLE

| FUNCTION NAME | INPUT DOMAIN | OUTPUT DOMAIN | LIBRARY NAME |
|---|---|---|---|
| Num2Yen () | VALUE AND "," | WITH - YEN | price.dll |
| Yen2Num () | WITH - YEN | VALUE AND "," | price.dll |
| Num2¥ () | VALUE AND "," | WITH - ¥ | price.dll |
| ¥2Num () | WITH - ¥ | VALUE AND "," | price.dll |
| Yen2¥ () | WITH - YEN | WITH - ¥ | price.dll |
| ¥2Yen () | WITH - ¥ | WITH - YEN | price.dll |

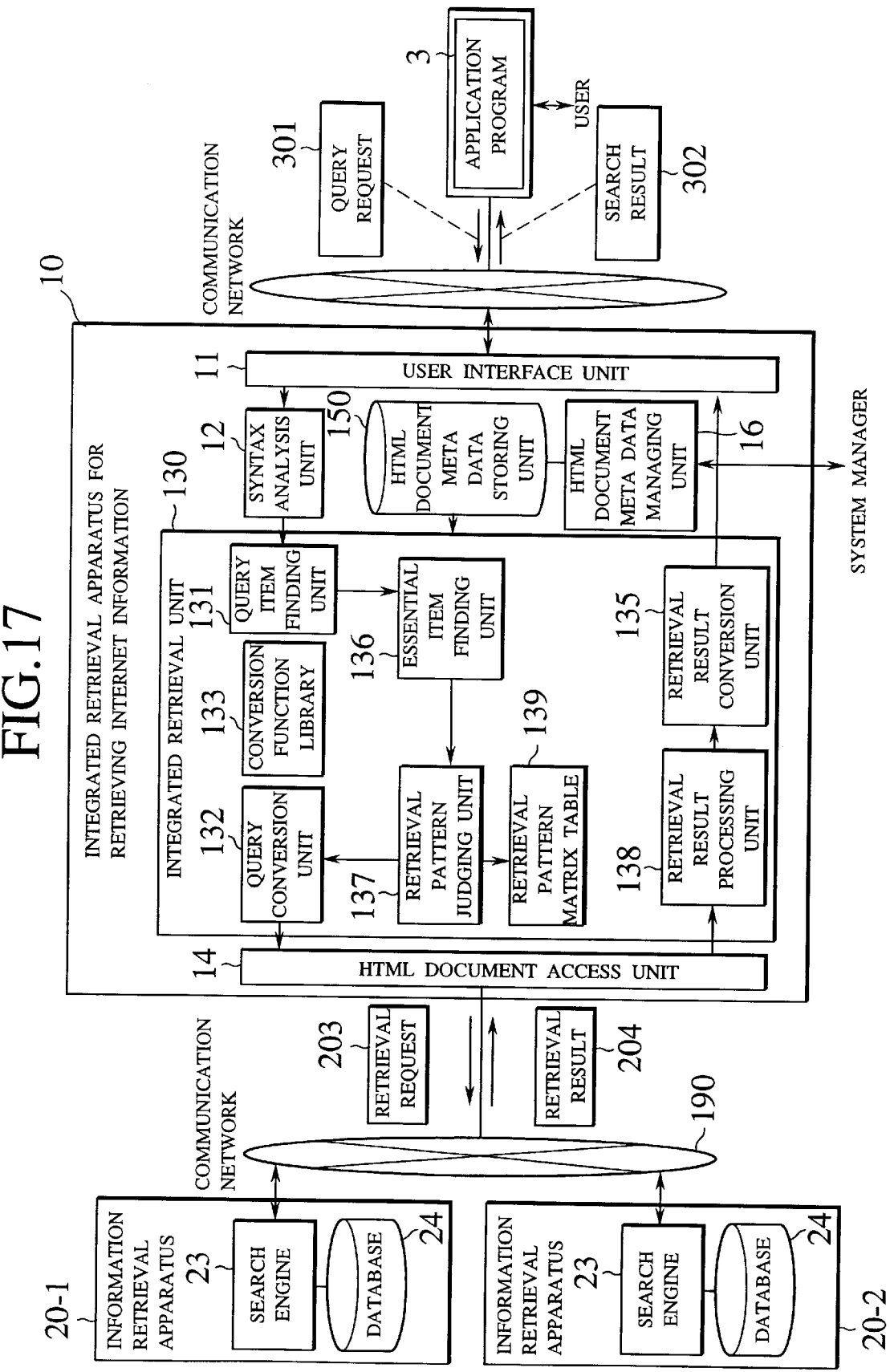

FIG.18

HTML DOCUMENT META DATA STORING UNIT

151 — HTML DOCUMENT TABLE

152 — HTML DOCUMENT TO TABLE MAPPING TABLE

153 — HTML DOCUMENT ITEM TABLE

154 — DOMAIN TABLE

155 — USER DOMAIN TABLE

156 — DOMAIN CONVERSION FUNCTION TABLE

157 — ESSENTIAL ITEM TABLE

FIG.19A

Page_A

SHOPS TO FIND

SHOP NAME [ ]

GENRE [ ]

[SEARCH]  [CLEAR]

FIG.19B

Page_B

SHOPS TO FIND

SHOP NAME [ ]   AREA [▽]

[SEARCH]  [CLEAR]

FIG.19C

Page_C

SHOPS TO FIND

AREA [ ]   GENRE
☐ JAPANESE FOOD
☐ WESTERN FOOD
☐ CHINESE FOOD
☐ OTHERS

[SEARCH]  [CLEAR]

FIG.20

```
Page_B HTML

<! DOCTYPE HTML PUBLIC"-//W3C//DTD W3 HTML//EN">
<HTML>
<HEAD>
<TITLE>page_B</TITLE>
</HEAD>
<BODY>
<FORM action=http://www.page_b.co.jp/cgi-bin/search.cgi method=GET>
SHOPS TO FIND<BR><BR>
<TABLE>
<TR>
<TH>
SHOP NAME
</TH>
<TH>
AREA
</TH>
</TR>
<TR>
<TD>
<INPUT name=key size=30>
</TD>
<TD>
<SELECT name=area>
   <OPTION value=00 SELECTED>
   <OPTION value=01>YOKOSUKA-SHI
   <OPTION value=02>FUJISAWA-SHI
   <OPTION value=03>HIRATSUKA-SHI
   <OPTION value=04>ATSUGI-SHI
   <OPTION value=05>ZUSHI-SHI
   <OPTION value=06>SAGAMIHARA-SHI
   <OPTION value=07>YOKOHAMA-SHI
   <OPTION value=08>CHIGASAKI-SHI
</SELECT>
</TD>
</TR>
</TABLE><BR>
<INPUT type=submit value=SEARCH>
<INPUT type=reset value=CLEAR>
</FORM>
</BODY>
</HTML>
```

FIG.22

HTML DOCUMENT ITEM TABLE

| PAGE NAME | COLUMN | ITEM NAME | AVAILABILITY | CONDITIONAL | DATA TYPE | NAME TAG | LOCAL DOMAIN |
|---|---|---|---|---|---|---|---|
| Page_A | 1 | SHOP NAME | ○ | ○ | CHARACTER STRING | shop | NONE |
| Page_A | 2 | AREA | ○ | — | CHARACTER STRING | — | NONE |
| Page_A | 3 | GENRE | ○ | ○ | CHARACTER STRING | category | NONE |
| Page_A | 4 | PHONE NUMBER | ○ | — | NUMERIC VALUE | — | Tel_Paren |
| Page_A | 5 | URL | ○ | ○ | CHARACTER STRING | — | NONE |
| Page_B | 1 | SHOP NAME | ○ | ○ | CHARACTER STRING | key | NONE |
| Page_B | 2 | AREA | ○ | ○ | CHARACTER STRING | area | Page_B_City |
| Page_B | 3 | GENRE | ○ | — | CHARACTER STRING | — | NONE |
| Page_B | 4 | PHONE NUMBER | ○ | — | NUMERIC VALUE | — | Tel_Bar |
| Page_C | 1 | SHOP NAME | ○ | — | CHARACTER STRING | — | NONE |
| Page_C | 2 | AREA | ○ | ○ | CHARACTER STRING | area | NONE |
| Page_C | 3 | GENRE | ○ | ○ | CHARACTER STRING | category | Page_C_Dishes |
| Page_C | 4 | URL | ○ | — | CHARACTER STRING | — | NONE |
| Page_C | 5 | PHONE NUMBER | ○ | — | NUMERIC VALUE | — | Tel_Bar |

FIG.23

| HTML DOCUMENT TABLE | |
|---|---|
| PAGE NAME | SEARCH ENGINE URL |
| Page_A | http://www.Page_a.co.jp/search-shop.cgi |
| Page_B | http://www.Page_b.co.jp/search-shop.cgi |
| Page_C | http://www.Page_c.co.jp/search-shop.cgi |

FIG.24

| HTML DOCUMENT TO TABLE MAPPING TABLE | | | | | | |
|---|---|---|---|---|---|---|
| PAGE NAME | RECORD START | COLUMN 1 | COLUMN 2 | COLUMN 3 | COLUMN 4 | COLUMN 5 |
| Page_A | "\<TR>\<TD>" | BETWEEN 1ST "\<TD>" AND 1ST "\</TD>" IN RECORD START LINE | BETWEEN 2ND \<TD> AND 2ND"\</TD>" IN RECORD START LINE | BETWEEN 3RD\<TD> AND 3RD"\</TD>" IN RECORD START LINE | BETWEEN 4TH \<TD> AND 4TH "\</TD>" IN RECORD START LINE | BETWEEN 5TH \<TD> AND 5TH "\</TD>" IN RECORD START LINE |
| Page_B | "\<TR>\<TD>" | BETWEEN 1ST "\<TD>" AND 1ST "\</TD>" IN RECORD START LINE | BETWEEN 2ND \<TD> AND 2ND"\</TD>" IN RECORD START LINE | BETWEEN 3RD \<TD> AND 3RD"\</TD>" IN RECORD START LINE | BETWEEN 4TH \<TD> AND 4TH "\</TD>" IN RECORD START LINE | Nil |
| Page_C | "\<TR>\<TD>" | BETWEEN 1ST "\<TD>" AND 1ST "\</TD>" IN RECORD START LINE | BETWEEN 2ND \<TD> AND 2ND"\</TD>" IN RECORD START LINE | BETWEEN 3RD\<TD> AND 3RD"\</TD>" IN RECORD START LINE | BETWEEN 4TH \<TD> AND 4TH "\</TD>" IN RECORD START LINE | BETWEEN 5TH \<TD> AND 5TH "\</TD>" IN RECORD START LINE |

FIG.25

| DOMAIN TABLE | | |
|---|---|---|
| DOMAIN GROUP | DOMAIN | NOTES |
| City | SHITSUKI | PRESENTATION WITH-SHI (SHITSUKI) |
| City | Page_B_City | PRESENTATION IN VALUE OF "VALUE" |
| Dishes | RYOURITSUKI | PRESENTATION WITH-FOOD (RYOURITSUKI) |
| Dishes | Page_C_Dishes | PRESENTATION IN VALUE OF "VALUE" |
| Tel | Tel_Bar | ＊＊＊－＊＊＊－＊＊＊＊ |
| Tel | Tel_Paren | (＊＊＊) ＊＊＊－＊＊＊＊ |

FIG.26

| CONVERSION FUNCTION TABLE | | | | |
|---|---|---|---|---|
| FUNCTION NAME | DOMAIN GROUP | INPUT DOMAIN | OUTPUT DOMAIN | LIBRARY NAME |
| Shi2ValueB () | Area | SHITSUKI | Page_B_City | select.dll |
| Rynuri2ValueC () | Category | RYOURITSUKI | Page_C_Dishes | select.dll |
| Bar2Paren () | Tel | Tel_Bar | Tel_Paren | select.dll |

FIG.27

| USER DOMAIN TABLE | | | |
|---|---|---|---|
| USER NAME | DOMAIN GROUP | USER INPUT DOMAIN | USER OUTPUT DOMAIN |
| USER 1 | Area | SHITSUKI | SHITSUKI |
| USER 1 | Category | RYOURITSUKI | RYOURITSUKI |
| USER 1 | Tel | Tel_Paren | Tel_Paren |

| ESSENTIAL ITEM TABLE | |
|---|---|
| PAGE NAME | ESSENTIAL ITEM |
| Page_A | GENRE |
| Page_B | AREA |
| Page_C | GENRE AND AREA |

FIG.30

RETRIEVAL PATTERN MATRIX

| QUERY REQUEST | | SEARCH ENGINE | | PROCESSING | | | |
|---|---|---|---|---|---|---|---|
| | | | | ITEM | | CONDITION | |
| ITEM | CONDITION | ITEM | CONDITION | RETURN RETRIEVAL CONDITION VALUE AS IT IS | RETURN VALUE FROM SEARCH ENGINE | PROCESS BY SEARCH ENGINE | FILTERING |
| ○ | ○ | ○ | ○ | × | ○ | ○ | × |
| ○ | ○ | ○ | × | ○ | × | × | ○ |
| ○ | ○ | × | ○ | ○ | × | ○ | × |
| ○ | × | ○ | × | × | ○ | × | × |
| ○ | × | ○ | ○ | × | ○ | × | × |
| ○ | × | × | ○ | — | — | — | — |
| × | ○ | ○ | × | × | × | ○ | × |
| × | ○ | ○ | ○ | × | × | × | ○ |
| × | ○ | × | ○ | × | × | ○ | × |

FIG.32

ITEM - PAGE TABLE

| ITEM NAME | PAGE NAME |
|---|---|
| SHOP NAME | Page_A, Page_B, Page_C |
| PHONE NUMBER | Page_A, Page_B, Page_C |
| AREA | Page_A, Page_B, Page_C |
| GENRE | Page_A, Page_B, Page_C |

FIG.33

RETRIEVAL REQUEST - PROCESS PATTERN (PAGE A)

| ITEM NAME | QUERY REQUEST | | Page_A PROCESSING | | | | |
|---|---|---|---|---|---|---|---|
| | ITEM CONDITION | ITEM CONDITION | ITEM | | CONDITION | | |
| | | | RETURN RETRIEVAL CONDITION VALUE AS IT IS | RETURN VALUE FROM SEARCH ENGINE | SEARCH ENGINE SOURCE | FILTERING |
| SHOP NAME | ○ | ○ | × | ○ | × | × |
| PHONE NUMBER | ○ | ○ | × | ○ | × | × |
| AREA | × | × | × | × | × | ○ |
| GENRE | × | ○ | × | × | ○ | × |

FIG.34

| ITEM NAME | RETRIEVAL REQUEST - PROCESS PATTERN (PAGE B) | | | | | | |
|---|---|---|---|---|---|---|---|
| | QUERY REQUEST | | Page_B | | | | |
| | ITEM | CONDITION | ITEM CONDITION | PROCESSING | | | |
| | | | | ITEM | | CONDITION | |
| | | | | RETURN RETRIEVAL CONDITION VALUE AS IT IS | RETURN VALUE FROM SEARCH ENGINE | SEARCH ENGINE SOURCE | FILTERING |
| SHOP NAME | ○ | ○ | ○ | × | ○ | × | × |
| PHONE NUMBER | ○ | ○ | × | × | ○ | × | × |
| AREA | × | ○ | ○ | × | × | ○ | × |
| GENRE | × | ○ | × | × | × | × | ○ |

FIG. 35

RETRIEVAL REQUEST - PROCESS PATTERN (PAGE C)

| ITEM NAME | QUERY REQUEST | | Page_C | | PROCESSING | | |
|---|---|---|---|---|---|---|---|
| | ITEM CONDITION | ITEM CONDITION | ITEM CONDITION | ITEM | | CONDITION | |
| | | | | RETURN RETRIEVAL CONDITION VALUE AS IT IS | RETURN VALUE FROM SEARCH ENGINE | SEARCH ENGINE SOURCE | FILTERING |
| SHOP NAME | ○ | × | ○ | × | ○ | × | × |
| PHONE NUMBER | ○ | × | ○ | × | ○ | × | × |
| AREA | × | ○ | ○ | × | × | ○ | × |
| GENRE | × | ○ | ○ | × | × | ○ | × |

FIG. 36

USER INPUT DOMAIN TO LOCAL DOMAIN TABLE

| PAGE NAME | ITEM | USER INPUT DOMAIN | LOCAL DOMAIN |
|---|---|---|---|
| Page_B | AREA | SHITSUKI | Page_B_City |
| Page_C | GENRE | RYOURITSUKI | Page_C_Dishes |

FIG.37A

DOCUMENT AS RETRIEVAL RESULT IN Page_B

EXEMPLARY DISPLAY BY WEB BROWSER

SHOP INFORMATION

| SHOP NAME | AREA | GENRE | PHONE NUMBER |
|---|---|---|---|
| B1 | YOKOHAMA-CITY | JAPANESE FOOD | 045-**-** |
| B2 | YOKOHAMA-CITY | CHINESE FOOD | 045-**-** |
| B3 | YOKOHAMA-CITY | CHINESE FOOD | 045-**-** |

FIG.37B

HTML DOCUMENT

```
<BODY>
<H1>SHOP INFORMATION </H1>

<TABLE BORDER>
  <TR><TH>SHOP NAME</TH><TH>AREA</TH><TH>GENRE</TH><TH>PHONE NUMBER</TH></TR>
  <TR><TD>B1</TD><TD>YOKOHAMA-CITY</TD><TD>JAPANESE FOOD</TD><TD>045-****-****</TD></TR>
  <TR><TD>B2</TD><TD>YOKOHAMA-CITY</TD><TD>CHINESE FOOD</TD><TD>045-****-****</TD></TR>
  <TR><TD>B3</TD><TD>YOKOHAMA-CITY</TD><TD>CHINESE FOOD</TD><TD>045-****-****</TD></TR>
</TABLE>
</BODY>
```

FIG.38

| USER OUTPUT DOMAIN TO LOCAL DOMAIN TABLE ||||
|---|---|---|---|
| PAGE NAME | ITEM | USER OUTPUT DOMAIN | LOCAL DOMAIN |
| Page_A | PHONE NUMBER | Tel_Paren | Tel_Paren |
| Page_B | PHONE NUMBER | Tel_Paren | Tel_Bar |
| Page_C | PHONE NUMBER | Tel_Paren | Tel_Bar |

| PROXY SERVER NAME | PROXY PORT NUMBER |
|---|---|
| Abc.ntt.co.jp | 80 |

FIG. 42

DESCRIPTION FOR FIRST TABLE
```
[shop_list]
TableEndDelimiter=</TABLE>
Word=shop_name,1,NULL
Word=area,1,NULL
Word=category,1,NULL
Word=tel,1,NULL
HtmlTemplate
<TR><TD>$shop_name$</TD><TD>$area$</TD><TD>$category$</TD><TD>$tel$</TD></TR>
HtmlTemplate
<TR><TD>$shop_name$</TD><TD>$area$</TD><TD><... >$category$<... ></TD><TD>$tel$</TD></TR>
```
⎫ EXTRACT ITEMS IF AGREES WITH ANY ONE OF THEM

DESCRIPTION FOR SECOND TABLE
```
[shop_list2]
TableEndDelimiter=</TABLE>
Word=shop_name,1,NULL
Word=area,1,NULL
Word=category,1,NULL
Word=tel,1,NULL
HtmlTemplate
<TR><TD>$shop_name$</TD><TD>$area$</TD><TD>$category$</TD><TD>$tel$</TD></TR>
HtmlTemplate
<TR><TD>$shop_name$</TD><TD>$area$</TD><TD><... >$category$<... ></TD><TD>$tel$</TD></TR>
```

DESCRIPTION FOR THIRD TABLE
```
[shop_list(evaluate)]
TableEndDelimiter=</TABLE>
Word=shop_name,1,NULL
Word=area,1,NULL
Word=category,1,NULL
Word=tel,1,NULL
Word=evaluation,1,NULL
HtmlTemplate
<TR><TD>$shop_name$</TD><TD>$area$</TD><TD>$category$</TD><TD>$tel$</TD><TD>$evaluation$</TD></TR>
```

DESCRIPTION FOR LINK
```
NextURL
<P>
<A HREF="$next_URL$">
</P>
```

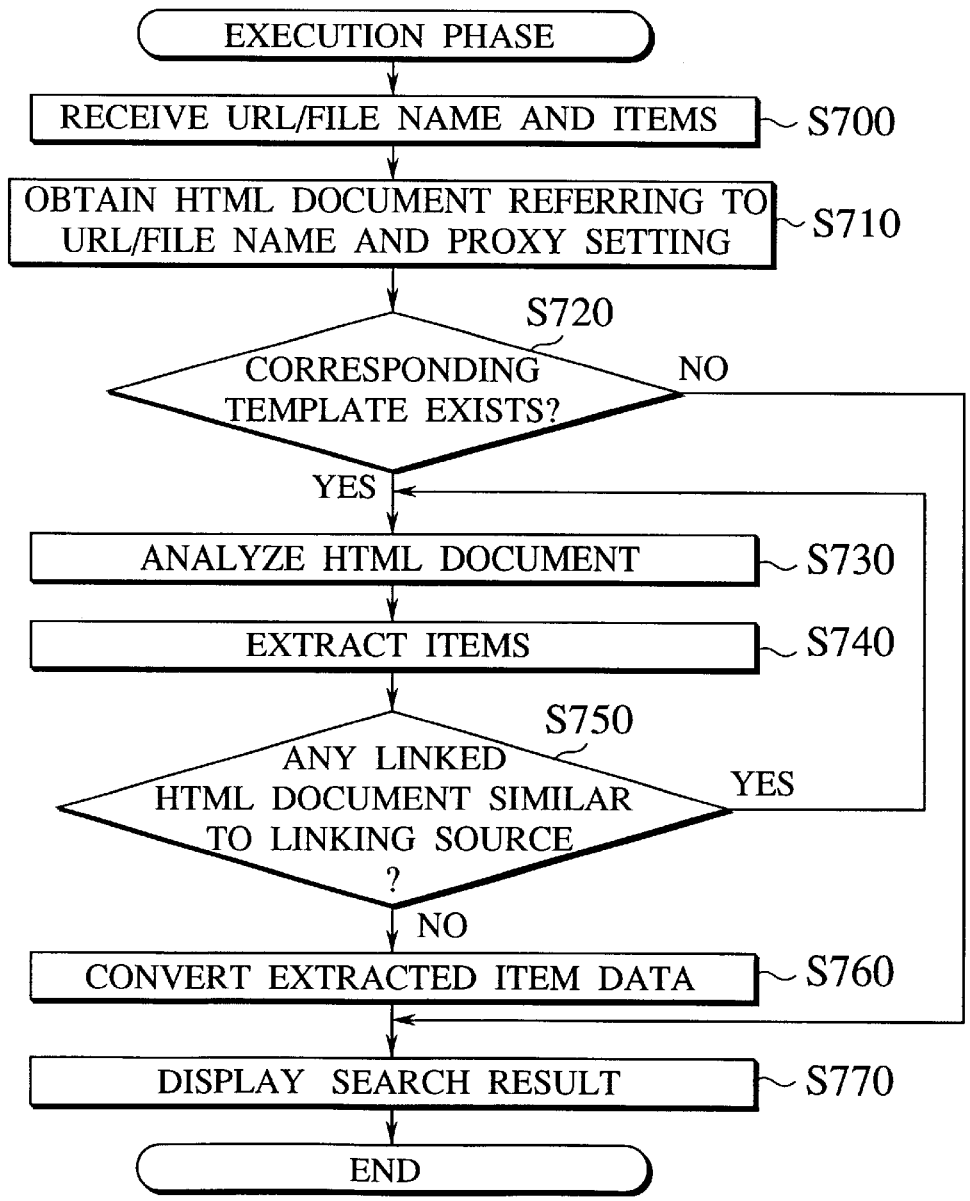

FIG. 45

| RENK | RECE | TRACK | DATE | DISTANCE | WEATHER·GROUND | TIME | WINNING HORSE | AGE | JOCKEY | TRAINER |
|---|---|---|---|---|---|---|---|---|---|---|
| C | OYAMAGINHAI | OYAMA | 1.5 | 2,000 | C·TH | 2:01.4 | (F)MEGUROFURONTIA | F7 | OKADA YUKIO | TANAKA YASUTAKA |
| C | ZANET S | OYAMA | 1.10 | 1,200 | C·B | R1:09.1 | (E)SUPERKATAYAMA | F5 | TAKE YUTAKA | KNISHI KAZUO |
| C | KYOTOHAI | OYAMA | 1.11 | 1,600 | C·F | 1:36.8 | (E)DAMARINSKI | F4 | SHIBAKI YOSHIOMI | TAKAHASHI KEIGI |
| B | MEARIKA JCC | OYAMA | 1.25 | 2,200 | F·F | 2:15.3 | (F)JIMEROBRIT | F5 | KAWADA HIROSHI | FUKAMI HIDEKAZU |
| A | BUFERRARI S | TOUHAN | 2.1 | 1,600 | C·F | 1:37.5 | (F)MEGRUFRONTIER | F7 | OKADA YUKIO | TANAKA YASUTAKA |
| C | TOUHAN SHINBUNHAI | TOUHAN | 2.8 | 1,600 | C·F | 1:34.2 | SMALLSANDAY | F5 | EBIHARA MASAYOSHI | KOO TADASHI |
| — | TOUHAN SYUGAI TOKUBETU(HARI) | TOUHAN | 2.14 | 3,300 | C·F | 3:39.7 | TEIKITIGER | F10 | MIDOU NOBUO | YOSHIOKA HACHIROU |
| — | KYODOU TOUSHINHAI 4SAI S | TOUHAN | 2.15 | 1,600 | C·B | 1:36.9 | (E)CONDORELPURSER | F4 | MATOBA HITOSHI | SANNOMIA KEI |
| C | INATAMONDO S | TOUHAN | 2.21 | 3,200 | C·TH | 3:17.6 | SAKOITOPTEN | F6 | KAWADA HIROSHI | SEIMU HIDATAKA |
| C | QUEEN C | TOUHAN | 2.22 | 1,600 | F·F | 1:35.2 | (F)DAIEIQEEN | F4 | HANAZAWA TAKANORI | SUSUKI YASUSHI |
| C | OYAMA MESUUMA S | OYAMA | 3.2 | 1,800 | F·H | 1:49.8 | JIMERORANBADA | F6 | TATEYAMA NOROHIRO | NUMAE YASUROU |
| B | UZUKISHOU | OYAMA | 3.8 | 2,000 | F·F | 2:01.8 | ULTRAWEEK | F4 | TAKE YUTAKA | KUROI TOSHIAKI |
| C | SATUKI S | OYAMA | 3.14 | 1,800 | F·F | 1:51.9 | (E)CHILDBULASTER | F7 | MOTOHASHI HIROKI | KOI HITOSHI |
| B | OYAMA KINEN | OYAMA | 3.15 | 1,800 | F·F | 1:48.6 | SAYKICKSUZUKA | F5 | TAKE YUTAKA | HASHIDA MITURU |
| C | WARAFU C | OYAMA | 3.21 | 1,800 | C·F | 1:50.4 | (E)HINOKICUTI | F4 | OKADA HIROSHI | FUKAMI SHUUICHI |
| B | PURIN S | OYAMA | 3.22 | 1,800 | C·TH | 1:49.8 | CREELHURRICANE | F4 | EBIHARA MASAYOSHI | YONEBA RUUICHI |
| B | TOTOSHOU | OYAMA | 3.29 | 2,500 | F·F | 2:34.4 | JINTENSHOUGUN | F9 | EBARA TERUO | YADA TERUMASA |
| C | ACRYLIC S | OYAMA | 4.5 | 1,200 | C·F | 1:08.5 | (E)KINKIPERFECT | F4 | EBIHARA MASAYOSHI | ARAGA TAKEO |
| C | BOOBYKYOU CT | OYAMA | 4.11 | 1,600 | F·TH | 1:34.3 | (E)WHITEHAWK | F5 | OKATA YUKIO | NAE SAKAE |
| — | OYAMA DAISHOUGAI(HARU) | OYAMA | 4.18 | 4,100 | C·H | 4:46.2 | THOUSANRAINBOW | F9 | TAYAMA TUYOSHI | SUSUKI YASUSHI |
| A | SATUKISHOU | OYAMA | 4.19 | 2,000 | F·F | 2:01.3 | SHOUUNSKY | F4 | TATEYAMA NORYIHIRO | TAKADA RYUICHI |
| B | JILAND T4 SAI S | TOUHAN | 4.26 | 1,400 | C·H | 1:22.2 | (E)CONDORELPURSER | F4 | MATOBA HITOSHI | SANNOMIYA KEI |
| B | SIPONSORSHO 4SAI MESU TOKU | TOUHAN | 5.2 | 2,000 | F·F | 2:00.3 | SPEEIJCANIXO | F4 | EBIHARA MASAYOSHI | ITO TAKEGI |
| C | WAKABASHOU | TOUHAN | 5.9 | 2,400 | C·F | 2:27.6 | YASUDAAGAIN | F5 | SHIBAKI YOSHIOMI | KAWAUCHI KENGI |
| B | TOUOUHAI SC | TOUHAN | 5.16 | 1,400 | F·H | R1:20.1 | (E)KITAISHUTTLE | F5 | OKADA YUKIO | SAWAFUGI KAZUO |
| A | NTT MILE S | TOUHAN | 5.17 | 1,600 | F·TH | 1:33.7 | (E)CONDORELPURSER | F4 | MATOBA HITOSHI | SANNOMIYA KEI |
| C | FURUGATA TAISHOUTEN | FURUGATA | 5.17 | 2,000 | C·F | R1:58.2 | LOUDHUNTER | F6 | YOSHIMOTO YUTAKA | KOKUBO HIROSHI |
| A | OYUMINO S | TOUHAN | 5.23 | 2,100 | F·F | 2:11.8 | IMPLAN | F7 | TAKE YUTAKA | ITO SHUIGI |
| C | KASHINOKISHOU | TOUHAN | 5.31 | 2,400 | C·F | 2:28.1 | MORIMOACCEL | F4 | MATOBA HITOSHI | KATOU KEIGI |
| C | RAGUBY C | TOUHAN | 6.6 | 1,800 | C·H | 1:48.2 | (E)HAKUBAHARMONY | F6 | TATEYAMA NORYIHIRO | ITOU MASANORI |

FIG.46

```
1111<HTML>
<HEAD>
<TITLE>HEISEI 10TH YEAR WINNING HOUSE LIST (KANTO) </TITLE>
</HEAD>
<BODY BGCOLOR="#ffffff">
<P>
<DIV ALIGN=CENTER><FONT SIZE=5><B>HEISEI 10TH YEAR WINNING HOUSE LIST (KANTO)
</B></FONT><BF></DIV>
<TABLE BORDER>
<TR>
<TH ALIGN=CENTER BGCOLOR="#80ffff"NOWRAP>RACE</TH><TH ALIGN=CENTER BGCOLOR=
"#80ffff"
NOWRAP>RANK</TH><TH ALIGN=CENTER BGCOLOR="#80ffff"NOWRAP>TRACK</TH>
<TH ALIGN=CENTER
BGCOLOR="#80ffff"NOWRAP>DATA</TH><TH ALIGN=CENTER BGCOLOR="#80ffff"NOWRAP>
DISTANCE(m)
</TH><TH ALIGN=CENTER BGCOLOR="#80ffff"NOWRAP>WEATHER · GROUND</TH>
<TH ALIGN=CENTER
BGCOLOR="#80ffff"NOWRAP>TIME</TH><TH COLSPAN=2 ALIGN=CENTER BGCOLOR="#80ffff"
NOWRAP>WINNING
HORSE</TH><TH ALIGN=CENTER BGCOLOR="#80ffff"NOWRAP>AGE</TH><TH ALIGN=CENTER
BGCOLOR="#80ffff"
NOWRAP>JOCKEY</TH><TH ALIGN=CENTER BGCOLOR="#80ffff"NOWRAP>TRAINER</TH>
</TR>
<TR>
<TD ALIGN=LEFT BGCOLOR="#b5ffb5"><A HREF="1998east/19980105-0611.html">OYAMAGYINHAI<
/A></TR><TD
ALIGN=CENTER BGCOLOR="#b5ffb5"NOWRAP>C</TD><TD BGCOLOR="#b5ffb5"NOWRAP>
OYAMA
</TD>TD
BGCOLOR="#b5ffb5">1 5</TD><TD ALIGN=RIGHT BGCOLOR="#b5ffb5">2,000</TD>
<TD
BGCOLOR="#b5ffb5">C · TH</TD><TD ALIGN=RIGHT BGCOLOR="#b5ffb5">2:01.4</T
D><TD
BGCOLOR="#b5ffb5" NOWRAP>(F)</TD><TD BGCOLOR="#b5ffb5">MEGUROFURONTIA</TD
><TD
BGCOLOR="#b5ffb5">F7</TD><TD BGCOLOR="#b5ffb5"NOWRAP>OKADA YUKIO</TD><TD
BGCOLOR="#b5ffb5">TANAKA YASUTAKA</TD>
</TR>
<TR>
<TD ALIGN=LEFT BGCOLOR="#b5ffb5"><A HREF="1998east/19980110-0611.html">ZANET5
</A></TD><TD ALIGN=CENTER BGCOLOR="#b5ffb5">C</TD><TD BGCOLOR="#b5ffb5">OYAMA</
TD><TD
BGCOLOR="#b5ffb5">1.10</TD><TD ALIGN=RIGHT BGCOLOR="#b5ffb5">1,200</T
D><TD
BGCOLOR="#b5ffb5">C · B</TD>TD ALIGN=RIGHT BGCOLOR="#b5ffb5">R1:09.1<
/TD><TD
BGCOLOR="#b5ffb5" >(E)</TD><TD BGCOLOR="#b5ffb5">SUPERKATAYAMA</TD><TD
BGCOLOR="#b5ffb5">F5</TD><TD BGCOLOR="#b5ffb5">TAKA YUTAKA</TD><TD BGCOLOR=
"#b5ffb5">KONISHI KAZUO</TD>
</TR>
<TR>
<TD ALIGN=LEFT BGCOLOR="#b5ffb5"><A HREF="1998east/19980111-0611.html">KYOTOHAI</A
></TD><TD
ALIGN=CENTER BGCOLOR="#b5ffb5">C<TD><TD BGCOLOR="#b5ffb5">OYAMA</TD>TD BGCOLO
```

Url=http://www.jba.go.jp/datafile/kachiuma//1998east.html

[JBA1998east]
Word=racename,1,NULL
Word=grade,1,NULL
Word=cercle,1,NULL
Word=mmdd,1,NULL
Word=distance,1,NULL
Word=condition,1,NULL
Word=time,1,NULL
Word=winhourse,1,NULL
Word=sex_age,1,NULL
Word=jockey,1,NULL
Word=teki,1,NULL
Word=url,5,http://www.jba.go.jp/datafile/kachiuma/

Html Template
\<tr\>
\<..\>\<A
HREF="$url$"\>"$racename$\</a\>\</td\>\<..\>$grade$\</TD\>\<..\>$cercle$\</TD\>\<..\>$mmdd$\</TD\>
\<..\>$distanc
e$\</TD\>\<..\>$condition$\</TD\>\<..\>$time$\</TD\>\<..\>\</TD\>\<..\>$winhourse$\</TD\>\<..\>$se
x_age$\</TD\>\<
..\>$jockey$\</TD\>\<..\>$teki$\</TD\>
\</TR\>

CANDIDATE MUNBER:1

| JOCKEY | WINNING HOUSE | RACE |
|---|---|---|
| OKADA YUKIO | MEGUROFURONTIA | OYAMAGINHAI |
| TAKE YUTAKA | SUPERKATAYAMA | ZANET S |
| SHIBAKI YOSHIOMI | DAMARINSKI | KYOTOHAI |
| KAWADA HIROSHI | JIMEROBRIT | MEARIKA JCC |
| OKADA YUKIO | MEGRUFRONTIER | BUFERRARI S |
| EBIHARA MASAYOSHI | SMALLSANDAY | TOUHAN SHINBUNHAI |
| MIDOU NOBUO | TEIKIITIGER | TOUHAN SYOUGAITOKUBETU(HARI) |
| MATOBA HITOSHI | CONDORELPURSER | KYODOU TOUSHINHAI 4SAI S |
| KAWADA HIROSHI | SAKOITOPTEN | INATAMONDO S |
| HANAZAWA TAKANORI | DAIEIQEEN | QUEEN C |
| TATEYAMA NOROHIRO | JIMERORANBADA | OYAMA MESUUMA S |
| TAKE YUTAKA | ULTRAWEEK | UZUKISHOU |
| MOTOHASHI HIROKI | CHILDBULASTER | SATUKI S |
| TAKE YUTAKA | SAYKICKSUZUKA | OYAMAKINEN |
| OKADA HIROSHI | HINOKICUTI | WARAFU C |
| EBIHARA MASAYOSHI | CREELHURRICANE | PURIN S |
| EBARA TERUO | JINTENSHOUGUN | TOTOSHOU |
| EBIHARA MASAYOSHI | KINKIPERFECT | ACRYLIC S |
| OKATA YUKIO | WHITEHAWK | BOOBYKYOU CT |
| TAYAMA TUYOSHI | THOUSANRAINBOW | OYAMADAISHOUGAI(HARU) |
| TATEYAMA NORYIHIRO | SHOUUNSKY | SATUKISHOU |
| MATOBA HITOSHI | CONDORELPURSER | JILAND T4 SAI S |
| EBIHARA MASAYOSHI | SPEEDCANDO | SPONSORSHO 4SAI MESU TOKU |
| SHIBAKI YOSHIOMI | YASUDAAGAIN | WAKABASHOU |
| OKADA YUKIO | KITAISHUTTLE | TOUOUHAI SC |
| MATOBA HITOSHI | CONDORELPURSER | NTT MILE S |
| YOSHIMOTO YUTAKA | LOUDHUNTER | FURUGATA TAISHOUTEN |
| TAKE YUTAKA | IMPLAN | OYUMINO S |
| MATOBA HITOSHI | MORUMOACCEL | KASHINOKISHOU |
| TATEYAMA NORYIHIRO | HAKUBAHARMONY | RAGUBY C |

FIG.49

1ST TABLE: SHOP INFORMATION (YOKOHAMA)

| SHOP MANE | AREA | GENRE | PHONE NUMBER |
|---|---|---|---|
| JAPANESE-FOOD 1 | YOKOHAMA | JAPANESE FOOD | *-**-XXXX |
| WESTERN-FOOD 1 | YOKOHAMA | WESTERN FOOD | *-**-YYYY |
| JAPANESE-FOOD 2 | YOKOHAMA | JAPANESE FOOD | *-**-ZZZZ |
| CHINESE-FOOD 1 | YOKOHAMA | CHINESE FOOD | *-**-WWWW |
| JAPANESE-FOOD 3 | YOKOHAMA | JAPANESE FOOD | *-**-QQQQ |

2ST TABLE: SHOP INFORMATION (YOKOHAMA 2)

| SHOP MANE | AREA | GENRE | PHONE NUMBER |
|---|---|---|---|
| WESTERN 1 | YOKOHAMA | WESTERN FOOD | *-**-SSSS |
| JAPANESE 1 | YOKOHAMA | JAPANESE FOOD | *-**-RRRR |
| JAPANESE 2 | YOKOHAMA | JAPANESE FOOD | *-**-TTTT |
| CHINESE 1 | YOKOHAMA | CHINESE FOOD | *-**-UUUU |
| WESTERN 2 | YOKOHAMA | WESTERN FOOD | *-**-VVVV |

3ST TABLE: SHOP INFORMATION WITH RATING (YOKOHAMA)

| SHOP MANE | AREA | GENRE | PHONE NUMBER | RATING |
|---|---|---|---|---|
| JAPANESE-FOOD 1 | YOKOHAMA | JAPANESE FOOD | AAAA | ★ |
| WESTERN-FOOD 1 | YOKOHAMA | WESTERN FOOD | BBBB | ★★ |
| JAPANESE-FOOD 2 | YOKOHAMA | JAPANESE FOOD | CCCC | ★★★ |
| CHINESE-FOOD 1 | YOKOHAMA | CHINESE FOOD | DDDD | ★★ |

RINK — NEXT PAGE

FIG. 50

1ST TABLE

SHOP INFORMATION (OTHERS)

| SHOP MANE | AREA | GENRE | PHONE NUMBER |
|---|---|---|---|
| RESTAURANT A | KAMAKURA | CHINESE FOOD | *-*-XYZA |
| RESTAURANT X | YOKOSUKA | JAPANESE FOOD | *-*-YZAB |
| RESTAURANT B | ZUSHI | WESTERN FOOD | *-*-ABCD |
| RESTAURANT Z | KAMAKURA | JAPANESE FOOD | *-*-WXYZ |
| RESTAURANT Y | ZUSHI | JAPANESE FOOD | *-*-QRST |

2ST TABLE

SHOP INFORMATION (OTHERS)

| SHOP MANE | AREA | GENRE | PHONE NUMBER |
|---|---|---|---|
| RESTAURANT C | KAMAKURA | CHINESE FOOD | *-*-XYZA |
| RESTAURANT E | KAMAKURA | WESTERN FOOD | *-*-WXYZ |
| RESTAURANT D | YOKOSUKA | JAPANESE FOOD | *-*-YZAB |
| RESTAURANT F | ZUSHI | WESTERN FOOD | *-*-ABCD |
| RESTAURANT G | ZUSHI | JAPANESE FOOD | *-*-QRST |

3ST TABLE

SHOP INFORMATION WITH RATING (OTHERS)

| SHOP MANE | AREA | GENRE | PHONE NUMBER | RATING |
|---|---|---|---|---|
| Q | KAMAKURA | JAPANESE FOOD | AABB | ★★★ |
| RESTAURANT R | ZUSHI | JAPANESE FOOD | ABAB | ★★ |
| RESTAURANT S | KAWASAKI | CHINESE FOOD | DCAB | ★ |
| RESTAURANT T | KAMAKURA | WESTERN FOOD | WZAB | ★★★ |

NEXT PAGE

FIG.51

```
<HTML>
<HEAD>
<TITLE>RESTAURANT INFORMATION 1</TITLE>
</HEAD>
<BODY>
<P>
<DIV>SHOP INFORMATION (YOKOHAMA)</DIV>
<TABLE BORDER>
<TR><TH>SHOP NAME</TH><TH>AREA</TH><TH>GENRE</TH><TH>PHONE NUMBER</TH></TR>
<TR><TD>JAPANESE-FOOD 1</TD><TD>YOKOHAMA</TD><TD><I>JAPANESE FOOD</I></TD><TD>****-****-XXXX</TD></TR>
<TR><TD>WESTERN-FOOD 1</TD><TD>YOKOHAMA</TD><TD>WESTERN FOOD</TD><TD>****-****-YYYY</TD></TR>
<TR><TD>JAPANESE-FOOD 2</TD><TD>YOKOHAMA</TD><TD><I>JAPANESE FOOD</I></TD><TD>****-****-ZZZZ</TD></TR>
<TR><TD>CHINESE-FOOD 1</TD><TD>YOKOHAMA</TD><TD>CHINESE FOOD</TD><TD>****-****-WWWW</TD></TR>
<TR><TD>JAPANESE-FOOD 3</TD><TD>YOKOHAMA</TD><TD><I>JAPANESE FOOD</I></TD><TD>****-****-QQQQ</TD></TR>
</TABLE>
</P>
<P>
<DIV>HOP INFORMATION (YOKOHAMA 2)</DIV>
<TABLE BORDER>
<TR><TH>SHOP NAME</TH><TH>AREA</TH><TH>GENRE</TH><TH>PHONE NUMBER</TH></TR>
<TR><TD>WESTERN-FOOD 1</TD><TD>YOKOHAMA</TD><TD>WESTERN FOOD</TD><TD>****-****-SSSS</TD></TR>
<TR><TD>JAPANESE-FOOD 1</TD><TD>YOKOHAMA</TD><TD><I>JAPANESE FOOD</I></TD><TD>****-****-RRRR</TD></TR>
<TR><TD>JAPANESE-FOOD 2</TD><TD>YOKOHAMA</TD><TD><I>JAPANESE FOOD</I></TD><TD>****-****-TTTT</TD></TR>
<TR><TD>CHINESE-FOOD 1</TD><TD>YOKOHAMA</TD><TD>CHINESE FOOD</TD><TD>****-****-UUUU</TD></TR>
<TR><TD>WESTERN-FOOD 2</TD><TD>YOKOHAMA</TD><TD>WESTERN FOOD</TD><TD>****-****-VVVV</TD></TR>
</TABLE>
</P>
<P>
<DIV>SHOP INFORMATION WITH RATING (YOKOHAMA)</DIV>
<TABLE BORDER>
<TR><TH>SHOP MANE</TH><TH>AREA</TH><TH>GENRE</TH><TH>PHONE NUMBER</TH><TH>RATING</TH></TR>
<TR><TD>JAPANESE-FOOD 1</TD><TD>YOKOHAMA</TD><TD>JAPANESE FOOD</TD><TD>(****)-****-AAAA</TD><TD>★</TD></TR>
<TR><TD>WESTERN-FOOD 1</TD><TD>YOKOHAMA</TD><TD>WESTERN FOOD</TD><TD>(***)-****-BBBB</TD><TD>★★★</TD></TR>
<TR><TD>CHINESE-FOOD 1</TD><TD>YOKOHAMA</TD><TD>CHINESE FOOD</TD><TD>(****)-****-CCCC</TD><TD>★★</TD></TR>
<TR><TD>JAPANESE-FOOD 2</TD><TD>YOKOHAMA</TD><TD>JAPANESE FOOD</TD><TD>(***)-****-DDDD</TD><TD>★</TD></TR>
</TABLE>
</P>
<P>
<A HREF="./htm_2.html">[NEXT PAGE]</A><BR>
</P>
</BODY>
</HTML>
```

1ST TABLE, 2ST TABLE, 3ST TABLE, LINK

FIG.52

```
<HTML>
<HEAD>
<TITLE>RESTAURANT INFORMATION 2</TITLE>
</HEAD>
<BODY>
<P>
<DIV>SHOP INFORMATION (OTHERS)</DIV>
<TABLE BORDER>
<TR><TH>SHOP MANE</TH><TH>AREA</TH><TH>GENRE</TH><TH>PHONE NUMBER</TH></TR>
<TR><TD>RESTAURANT A</TD><TD>KAMAKURA</TD><TD>CHINESE FOOD</TD><TD>***-***-XYZA</TD></TR>
<TR><TD>RESTAURANT X</TD><TD>YOKOSUKA</TD><TD>JAPANESE FOOD</TD><TD>***-***-YZAB</TD></TR>
<TR><TD>RESTAURANT B</TD><TD>ZUSHI</TD><TD><I>WESTERN FOOD</I></TD><TD>***-***-ABCD</TD></TR>
<TR><TD>RESTAURANT Z</TD><TD>KAMAKURA</TD><TD>JAPANESE FOOD</TD><TD>***-***-WXYZ</TD></TR>
<TR><TD>RESTAURANT Y</TD><TD>ZUSHI</TD><TD>JAPANESE FOOD</TD><TD>***-***-QRST</TD></TR>
</TABLE>
</P>
<P>
<DIV>HOP INFORMATION (OTHERS)</DIV>
<TABLE BORDER>
<TR><TH>SHOP MANE</TH><TH>AREA</TH><TH>GENRE</TH><TH>PHONE NUMBER</TH></TR>
<TR><TD>RESTAURANT C</TD><TD>KAMAKURA</TD><TD>CHINESE FOOD</TD><TD>***-***-XYZA</TD></TR>
<TR><TD>RESTAURANT E</TD><TD>KAMAKURA</TD><TD><I>WESTERN FOOD</I></TD><TD>***-***-WXYZ</TD></TR>
<TR><TD>RESTAURANT D</TD><TD>YOKOSUKA</TD><TD>JAPANESE FOOD</TD><TD>***-***-YZAB</TD></TR>
<TR><TD>RESTAURANT F</TD><TD>ZUSHI</TD><TD><I>WESTERN FOOD</I></TD><TD>***-***-ABCD</TD></TR>
<TR><TD>RESTAURANT G</TD><TD>ZUSHI</TD><TD>JAPANESE FOOD</TD><TD>***-***-QRST</TD></TR>
</TABLE>
</P>
<P>
<DIV>SHOP INFORMATION WITH RATING (OTHERS)</DIV>
<TABLE BORDER>
<TR><TH>SHOP NAME</TH><TH>AREA</TH><TH>GENRE</TH><TH>JAPANESE FOOD</TH><TH>PHONE NUMBER</TH><TH>RATING</TH></TR>
<TR><TD>RESTAURANT Q</TD><TD>KAMAKURA</TD><TD>JAPANESE FOOD</TD><TD>(***)-***-AABB</TD><TD>★★</TD></TR>
<TR><TD>RESTAURANT R</TD><TD>ZUSHI</TD><TD>JAPANESE FOOD</TD><TD>(***)-***-ABAB</TD><TD>★</TD></TR>
<TR><TD>RESTAURANT S</TD><TD>KAWASAKI</TD><TD>CHINESE FOOD</TD><TD>(***)-***-DCAB</TD><TD>★★★</TD></TR>
<TR><TD>RESTAURANT T</TD><TD>KAMAKURA</TD><TD>WESTERN FOOD</TD><TD>(***)-***-WZAB</TD><TD>★★★</TD></TR>
</TABLE>
</P>
<P>
<A HREF="./htm_3.html">[NEXT PAGE]</A><BR>
</P>
</BODY>
</HTML>
```

1ST TABLE, 2ST TABLE, 3ST TABLE, LINK

INTEGRATED RETRIEVAL SCHEME FOR RETRIEVING SEMI-STRUCTURED DOCUMENTS

BACKGROUND OF THE INVENTION

1. Field of the Invention

The present invention relates to a retrieval technique applied to an open network environment that involves a plurality of semi-structured documents and search engines. In particular, the present invention relates to an integrated retrieval scheme by managing the location data, document structure data, item data, presentation style data, etc., to provide a unified interface for retrieving required information item by item from a plurality of semi-structured documents irrespective of differences among the locations, document structures, elements, input forms of search engines.

2. Description of the Prior Art

Increasing performance and decreasing cost in personal computers, improvements in network technology, and the growth of inexpensive network providers are vitalizing open networks, in particular, the Internet. Many information providers employ HTML (hypertext markup language), that is description language of hytertext for realizing easy contents creation, to transmit various informations to users through the open networks. The number of information providers is increasing due to an exploding increase in information consumers. This results in accumulating various kinds of information in the networks, and it is required to efficiently provide each consumer with necessary information from among the accumulated pieces of information.

The consumers want to entirely retrieve desired information from across information sources. It is hardly granted because information accumulated in the open networks is mostly in HTML documents that have mutually different structures, presentation styles, or search formats to retrieve devised information from across different information sources.

Information retrieval apparatus, so called, search engines are widely used with respect to retrieving HTML documents scattered over the network. Here, the search engine is a generic term for system retrieving certain information through input form. FIG. 1 shows an information retrieval technique according to a prior art using URL search engine. The URL search engine is a search engine returning URL as search result with respect to query with keyword or conditional term. For example, a user has an interest in "a PC of 100,000 yen or below." The user enters keywords into an URL search engine. FIG. 2 shows an example of an URL search engine according to a prior art. The URL search engine 900 has a keyword index 910 that contains keywords and locations, i.e., URLs related to HTML documents spreading over networks, the keyword index 910 is registered in advance. A search processor 930 searches the keyword index 910 for the keywords entered by the user and returns a list of URLs and outlines, the URL indicates location of HTML documents that contain the entered keywords and its synonym. Returning to FIG. 1, the user accesses the returned HTML documents one by one to find out necessary information. In this way, first, the users had to find out the locations of HTML documents that may contain necessary information by wide document search, and then inspect each of the HTML documents in obtained URL list for the necessary information when obtaining the information from HTML documents of which is unknown, so that it needs long time and labor to obtain necessary information. The users must spend much time and labor before they get necessary information. In addition, the prior arts are incapable of collectively retrieving information from across a plurality of HTML documents.

The prior arts may find out the locations of HTML documents that contain given keywords and the synonyms thereof but are unable to collect information item by item by collectively retrieving information involved in HTML documents. The prior arts are-unable to set conditions on search results. For example, they are unable to filter search results by date. And, when using URL search engine that provides search interface for each HTML document as input form, users must take into account such individual form input interface for each URL search engine and access each URL search engine one by one.

More particularly, HTML documents employed in on-line shops of electronic commerce frequently show the product information such as names and prices with list description of table or clause style that includes one meaningful clustered data. There are demands to retrieve information collectively among these HTML documents of on-line shops. For example, a user may want to retrieve information about shops that offer the lowest price for a specific product. In this case, the user enters the name, maker, category, etc., of the product as keywords. Then, the prior art of FIG. 1 provides the user with the locations of HTML documents related to the keywords. The user accesses the HTML documents one by one to check to see if they offer the product under preferable conditions. The prior art of FIG. 1, however, searches the full text of each HTML document for the entered keywords without considering elements that form the HTML document, and therefore, tends to retrieve a lot of irrelevant data for the user. Accordingly, the user must spend much time and labor to find out the necessary information from among the HTML documents retrieved by the prior art.

The prior arts are incapable of retrieving information from a given HTML document item by item. For example, they are unable to extract the price, image, maker, etc., of a given product from a given HTML document containing product information table. The prior arts are unable to extract the name, phone number, address, etc., of each shop from a given HTML document containing claused-shop information. The prior arts are unable to set conditions such as date to filter results retrieved from HTML documents.

There is a conventional technique that creates a hypothetical database by mapping the internal structure of each document and relationships between documents into unique models, to extract itemized pieces of information. This technique was disclosed by N. Ashish and C. A. Knoblock in "Semi-automatic wrapper generation for internet information sources," Proceedings of Cooperative Information Systems, 1997. This technique considers a portion in HTML document as meaningful information, the portion has specific tags such as TITLE tag such as size, color, typestyle (e.g., bold and italic), and extracts these information automatically. This technique cover a case that minimum cluster of certain information is described in one HTML document, and a plurality of the HTML documents are described in mutually same format. This technique is, for example, effective when regionalized weather information is described in different HTML documents. However, this technique doesn't take into account a case that information is described as a list description such as table or clause in one HTML document. Accordingly, this technique is unable to be applied to the above case.

J. Hammer, H. Garcia-Molina, J. Cho, R. Araha, and A. Crespo disclosed another technique in "Extracting semistructured information from the web," Workshop on Management of Semistructured Data, 1997. This technique creates a hypothetical database by employing an unique OEM data model, and manage relationship between the database and various information sources, and therefore, retrieve information from heterogeneous web sources integratively. This technique employs template file depending on HTML tag description rule for HTML document to manage above relationship. However, in this technique, modification in HTML document affect hypothetical database and also modification in hypothetical database affect application. Accordingly, this technique need much labor for management and maintenance of system.

There are no standards for HTML descriptions used for information providing such as products handled by on-line shops. Namely, on-line shops are using individual HTML documents. This will be explained.

HTML documents prepared by on-line shops have different document structures. For example, a shop A employs a tag TABLE to describe products in table format, while a shop B employs a tag UL to itemize products in clause format.

The HTML documents of on-line shops employ different presentation styles even for the same product. For example, yen, thousand yen, ten-thousand yen, dollars, etc., are used as unit prices depending on shops. Some shops use double-byte characters to express prices and others employ single-byte characters for the same purpose.

The HTML documents of on-line shops have different data elements even for the same product. For example, a product is represented with only the name thereof, or the name and model number thereof, or the maker, name, and model number thereof depending on shops. To get necessary information from HTML documents gathered by the conventional retrieval techniques, users must extract pieces of information from the documents and compare them with one another. It takes a long time and much labor to retrieve necessary data from them.

In addition, when using plural search engines, the search engines used to search open networks for required information differ from one another in information types to handle, performance, and fees, and therefore, the users must choose them depending on situations. In otherwise, for this purpose, the users must know the locations, and interfaces of the search engines peculiarly.

First, it is difficult to find and manage the locations of search engines. The users must individually manage the locations of search engines with the use of, for example, bookmarks. This is hard to achieve in an environment using all terminal but own terminal, such as moble environment.

Second, the search interfaces of search engines provided by input forms are not unified. Many search engines employ their own input forms of which structure are not unified. Accordingly, the users must acquire separate systems and operation sequences and schemes when handling different search engines. It is hard for the users to know which search engine is effective for certain search item. It is also hard for the users to process information conditionally contained in retrieved HTML documents.

Third, the search information through search engines are inefficient. The users must handle several search engines until they get required information. This involves many search operations and is inefficient.

Fourth, the search engines return search result that is different item presentation styles, character codes, etc., when presenting search results, and it is difficult for the users to compare the search results with one another.

To solve the heterogeneity among the search engines, Jumon World Seek at http://member.nifty.ne.jp/jumon has disclosed a technique of preparing a common search interface for URL search engines that is one kind of search engine, managing relationships between the common search interface and individual interface for URL search engines, converting a search request for the common search interface into search requests for the search engines, and executing the search requests for the search engines. This technique provides the common search interface employing a single text box to handle the URL search engines. In practice, there are not only the URL search engines but also other various search engines. To use such a variety of search engines, this technique has the following problems:

(1) Necessity of Considering a Plurality of Input Items

Some search engines employ a simplest input form with a single text box for entering keywords to search. To narrow information to retrieve, some search engines allow the users to enter search conditions such as an area and an industry field in addition to keywords. However, the technique mentioned above is incapable of achieving such a narrowing search operation because it does not support a plurality of input items.

(2) Necessity of Coping with a Variety of Input Forms

To properly enter search conditions, some search engines employ several input form objects for text input such as text boxes, radio buttons for selecting one among several items, and select boxes or check boxes for selecting some among several items. The technique mentioned above is incapable of coping with these data entering objects except for text box because it supports only a single text box.

(3) Reconstruction of Application

When adding, correcting, deleting search engines with respect to the common search interface, the technique mentioned above must correct the common search interface and reconstruct corresponding applications.

In this way, the conventional technique mentioned above is incapable of coping with a variety of search engines and needs a lot of time and labor to design, maintain, and manage.

SUMMARY OF THE INVENTION

An object of the present invention is to provide an integrated retrieval scheme capable of retrieving required information from a plurality of semi-structured documents such as HTML documents that are scattering over open networks and have different document structures, presentation styles, and information elements, converting the retrieved information into a unified form for each user, and returning the information in the unified form to the user.

Another object of the present invention is to provide an integrated retrieval scheme capable of individually managing input form objects of each search engine serving for open networks to resolve differences among the search engines, generating search requests specific to the search engines according to a user's search request, and executing search operations with respect to the search engines in open network environment including many search engines.

Still another object of the present invention is to provide an integrated retrieval scheme capable of managing the location, document structure, and item attributes of each HTML document and extracting required information item by item from different HTML documents that differs in the location, the document structure, and attributes arbitrary.

In order to accomplish the objects, an aspect of the present invention provides an apparatus for retrieving data contained in a plurality of semi-structured documents over open networks, comprising: a unit for storing meta data for each of the semi-structured documents, the meta data including items to be extracted from the semi-structured documents and item data used to conditionally retrieve the items; a unit for retrieving data scattered among the semi-structured documents for entered query according to the meta data, and preparing a collective search result; and a unit for outputting the search result in a prescribed single format that is specific to each user.

Another aspect of the present invention provides an apparatus for retrieving data contained in a plurality of semi-structured documents over open networks, comprising: (a) a unit for storing location data about the location of each of the semi-structured documents, document structure data about the structure of each of the semi-structured documents, used to delimit document into items to be extracted, attribute data about the attributes of each of the items to be extracted, used to conditionally retrieve the items, and style conversion data used to convert item presentation styles of the user and item presentation styles of the semi-structured documents from one into another; (b) a unit for finding, according to the location data, the location of a semi-structured document that contains all search items specified in an entered query that consists of the search items and search conditions; (c) a unit for converting, if necessary, item presentation styles of the entered query into item presentation styles of the search item in location found semi-structured documents according to the style conversion data, and forming queries for the location found semi-structured documents; (d) a unit for transmitting the queries provided by the unit (c) to the found locations and acquiring the semi-structured documents; (e) a unit for extracting item data from the acquired semi-structured documents according to the document structure data, selecting the extracted item data, if necessary, according to the attribute data for the search condition, and preparing a search result; and (f) a unit for converting, if necessary, item presentation styles of the search result into the item presentation styles of each user according to the style conversion data.

Still another aspect of the present invention provides an apparatus for retrieving data through search engines over open networks, comprising: (aa) a unit for storing location data about the location of each search engine, essential input item data specifying essential input items required by an input form of each search engine, document structure data about the structure of each HTML document, used to delimit document into items to be extracted, attribute data about the attributes of the items to be extracted, used to conditionally retrieve the items, and style conversion data used to convert item presentation styles of a user and item presentation styles of each HTML document from one into another; (bb) a unit for finding, according to the location data, the location of a search engine that contains all search items specified in an entered query that consists of the search items and search conditions; (cc) a unit for selecting, according to the essential input item data, search engine to be searched from among the location found search engines, the search engine of which the essential input item satisfy the specified search condition; (dd) a unit for determining an optimum retrieval pattern for each of the selected search engines according to a matrix table and converting the entered query into queries for the selected search engines accordingly, the matrix table defining combination between the search items and search conditions and the items and essential input items of each search engine; (ee) a unit for converting, if necessary, item presentation styles of the queries provided by the unit (dd) into item presentation styles of the search item in selected search engines according to the style conversion data; (ff) a unit for transmitting the queries provided by the unit (ee) to the found locations and acquiring HTML documents; (gg) a unit for extracting item data from the acquired HTML document serving as a first search result according to the structure data, selecting the extracted item data, if necessary, according to the attribute data for the search condition on the basis of corresponding retrieval pattern and preparing a second search result; and (hh) a unit for converting, if necessary, item presentation styles of the second search result into item presentation styles of each user according to the style conversion data.

Still another aspect of the present invention provides an apparatus for extracting data item by item from arbitrary HTML document over open networks, comprising: (aaa) a unit for storing a template for each HTML document according to document structure data about the structure of the HTML document used to delimit document into items to be extracted, the template stipulating at least item name to be extracted and prescribed text extraction style data of item group to be extracted from the HTML document; (bbb) a unit for analyzing a template corresponding to acquired HTML document; and (ccc) a unit for comparing the acquired HTML documents with corresponding template by scanning the acquired HTML document, and extracting item data of the items matching the text extraction style data of the template, so as to prepare a search result.

Still another aspect of the present invention provides a method of retrieving data contained in a plurality of semi-structured documents over open networks, comprising the steps of: retrieving data scattered among semi-structured documents for entered query according to meta data about each of the semi-structured documents and preparing a collective search result, the meta data including items to be extracted from the semi-structured documents and item data used to conditionally retrieve the items; and outputting the search result in a prescribed single format that is specific each the user.

Still another aspect of the present invention provides a method of retrieving data contained in a plurality of semi-structured documents over open networks, comprising the steps of: (a) finding, according to location data that specifies the location of each of the semi-structured documents, the location of a semi-structured document that contains all search items specified in an entered that consists of the search items and search conditions; (b) converting, if necessary, item presentation styles of the entered query into item presentation styles of the search item in location found semi-structured documents according to style conversion data and forming queries for the location found semi-structured documents, the style conversion data being used to convert item presentation styles of a user and item presentation styles of the semi-structured documents from one into another; (c) transmitting the queries provided by the step b) to the found locations and acquiring the semi-structured documents; (d) extracting item data from the acquired semi-structured documents according to document structure data, selecting the extracted item data, if necessary, according to attribute data for the search condition and preparing a search result, the document structure data specifying the structure of each of the semi-structured documents and being used to delimit document into items to be extracted, the attribute data specifying the attributes of each item to be extracted and being used to conditionally retrieve the items; and (e) converting, if necessary, item presentation styles of the search result into the item presentation styles of each user according to the style conversion data.

Still another aspect of the present invention provides a method of retrieving data through search engines over open networks, comprising the steps of: (aa) finding, according to location data that specifies the location of each search engine, the location of a search engine that contains all search items specified in an entered query that consists of the search items and search conditions; (bb) selecting, according to essential input item data that specifies essential input items required by an input form of each search engine, search engine to be searched from among the location found search engines, the search engine of which the essential input item satisfy the specified search condition; (cc) determining an optimum retrieval pattern for each of the selected search engines according to a matrix table and converting the entered query into queries for the selected search engines accordingly, the matrix table defining combination between the search items and search conditions and the items and essential input items of each search engine; (dd) converting, if necessary, item presentation styles of the queries provided by the step (cc) into item presentation styles of the search item in selected search engines according to style conversion data that is used to convert item presentation styles of a user and item presentation styles of each HTML document from one into another; (ee) transmitting the queries obtained by the step (dd) to the found location and acquiring HTML documents; (ff) extracting item data from the acquired HTML document serving as first search result according to document structure data, selecting, if necessary, the extracted item data according to attribute data for the searching condition on the basis of corresponding retrieval pattern, and preparing a second search result, the document structure data specifying the structure of each HTML document and being used to delimit document into items to be extracted, the attribute data specifying the attributes of the items to be extracted and being used to conditionally retrieve the items; and (gg) converting, if necessary, item presentation styles of the second search result into item presentation styles of each user according to the style conversion data.

Still another aspect of the present invention provides a method of extracting data item by item from arbitrary HTML document over open networks, comprising the steps of: (aaa) analyzing a template corresponding to acquired HTML document, the template for each HTML document being set according to document structure data that specifies the structure of each HTML document and is used to delimit document into items to be extracted, the templates stipulating at least item name to be extracted and prescribed text extraction style data of item group to be extracted from the corresponding HTML document; and (bbb) comparing the acquired HTML documents with corresponding template by scanning the acquired HTML document, and extracting item data of the items watching the text extraction style data of the template, so as to prepare a search result.

Still another aspect of the present invention provides a computer readable recording medium recording a program for causing the computer to execute processing for retrieving data contained in a plurality of semi-structured documents over open networks, the processing including: a process for retrieving the data scattered among semi-structured documents for entered query according to meta data about each of the semi-structured documents and preparing a collective search result, the meta data including items to be extracted from the semi-structured documents and item data used to conditionally retrieve the items; and a process for outputting the search result in a prescribed single format that is specific each the user.

Still another aspect of the present invention provides a computer readable recording medium recording a program for causing the computer to execute processing for retrieving data involved in a plurality of semi-structured documents over open networks, the processing including: (a) a process for finding, according to location data that specifies the location of each of the semi-structured documents, the location of a semi-structured document that contains all search items specified in an entered that consists of the search items and search conditions; (b) a process for converting, if necessary, item presentation styles of the entered query into item presentation styles of the search item in location found semi-structured documents according to style conversion data and forming queries for the location found semi-structured documents, the style conversion data being used to convert item presentation styles of a user and item presentation styles of the semi-structured documents from one into another; (c) a process for transmitting the queries provided by the process (b) to the found locations and acquiring the semi-structured documents; (d) a process for extracting item data from the acquired semi-structured documents according to document structure data, selecting the extracted item data, if necessary, according to attribute data for the search condition and preparing a search result, the document structure data specifying the structure of each of the semi-structured documents and being used to delimit document into items to be extracted, the attribute data specifying the attributes of each item to be extracted and being used to conditionally retrieve the items; and (e) a process for converting, if necessary, item presentation styles of the search result into the item presentation styles of each user according to the style conversion data.

Still another aspect of the present invention provides a computer readable recording medium recording a program for causing the computer to execute processing for retrieve data through search engines over the open networks, the processing including: (aa) a process for finding, according to location data that specifies the location of each search engine, the location of a search engine that contains all search items specified in an entered query that consists of the search items and search conditions; (bb) a process for selecting, according to essential input item data that specifies essential input items required by an input form of each search engine, search engine to be searched from among the location found search engines, the search engine of which the essential input item satisfy the specified search condition; (cc) a process for determining an optimum retrieval pattern for each of the selected search engines according to a matrix table and converting the entered query into queries for the selected search engines accordingly, the matrix table defining combination between the search items and search conditions and the items and essential input items of each search engine; (dd) a process for converting, if necessary, item presentation styles of the queries provided by the process (cc) into item presentation styles of the search item in selected search engines according to style conversion data that is used to convert item presentation styles of a user and item presentation styles of each HTML document from one into another; (ee) a process for transmitting the queries obtained by the process (dd) to the found location and acquiring HTML documents; (ff) a process for extracting item data from the acquired HTML document serving as first search result according to document structure data, selecting, if necessary, the extracted item data according to attribute data for the searching condition on the basis of corresponding retrieval pattern, and preparing a second search result, the document structure data specifying the structure of each HTML document and being used to delimit document into items to be extracted, the attribute data specifying the attributes of the items to be extracted and being used to conditionally retrieve the items; and (gg) a process for converting, if necessary, item presentation styles of the second search result into item presentation styles of each user according to the style conversion data.

Still another aspect of the present invention provides a computer readable recording medium recording a program for causing the computer to execute processing for extracting data item by item from arbitrary HTML documents over open networks, the processing including: (aaa) a process for analyzing a template corresponding to acquired HTML document, the template for each HTML document being set according to document structure data that specifies the structure of each HTML document and is used to delimit document into items to be extracted, the templates stipulating at least item name to be extracted and prescribed text extraction style data of item group to be extracted from the corresponding HTML document; and (bbb) a process for comparing the acquired HTML documents with corresponding the template by scanning the acquired HTML document, and extracting item data of the items matching the text extraction style data of the template, so as to prepare a search result.

Other and further objects and features of the present invention will become apparent from the following description taken in conjunction with the accompanying drawings.

BRIEF DESCRIPTION OF THE DRAWINGS

FIG. 8 is a flow chart showing an execution phase of the first embodiment;

FIGS. 9A and 9B show the exemplary display and HTML description of an HTML document;

FIGS. 10A and 10B show the display and HTML description of another HTML document;

FIG. 11 shows an example of an HTML document table stored in the storing unit of FIG. 6;

FIG. 12 shows an example of a HTML document to table mapping table stored in the storing unit of FIG. 6;

FIG. 13 shows an example of a HTML document item table stored in the storing unit of FIG. 6;

FIG. 14 shows an example of a domain table stored in the storing unit of FIG. 6;

FIG. 15 shows an example of a user domain table stored in the storing unit of FIG. 6;

FIG. 16 shows an example of a domain conversion function table stored in the storing unit of FIG. 6;

FIG. 17 shows an Internet information integrated retrieval according to a second embodiment of the present invention;

FIG. 18 shows a HTML document meta data storing unit according to the second embodiment arranged in the apparatus of FIG. 17;

FIGS. 19A, 19B, and 19C show examples of input forms of search engines according to the second embodiment;

FIG. 20 shows an HTML description corresponding to the input form of FIG. 19B;

FIG. 22 shows an example of a HTML document item table stored in the storing unit of FIG. 18;

FIG. 23 shows an example of a HTML document table stored in the storing unit of FIG. 18;

FIG. 24 shows an example of a HTML document to table mapping table stored in the storing unit of FIG. 18;

FIG. 25 shows an example of a domain table stored in the storing unit of FIG. 18;

FIG. 26 shows an example of a domain conversion function table stored in the storing unit of FIG. 18;

FIG. 27 shows an example of a user domain table stored in the storing unit of FIG. 18;

FIG. 30 shows a search pattern matrix table according to the second embodiment;

FIG. 32 shows a location for data items in step S410 of FIG. 31;

FIGS. 33 to 35 show retrieval pattern for pages A to C prepared in step S440 of FIG. 31;

FIG. 36 shows relationships between user input domains and local domains prepared in step S450 of FIG. 31;

FIGS. 37A and 37B show the exemplary display and HTML description of a search result from page B;

FIG. 38 shows relationships between local domains and user output domains prepared in step S500 of FIG. 31;

FIG. 42 shows an example of a template file;

FIG. 43 shows an example of a URL-template table;

FIG. 44 is a flow chart showing an execution phase of the third embodiment;

FIG. 45 shows a display of an HTML document on a Web browser;

FIG. 46 shows a part of HTML description corresponding to the display of FIG. 45;

FIG. 47 shows a template file for extracting item data from the HTML document of FIG. 45, FIG. 46;

FIG. 48 shows an example of extraction made from the HTML document of FIG. 45 according to the template file of FIG. 47; and FIG. 49 shows a display of an HTML document on a Web browser according to a modification of the third embodiment;

FIG. 50 shows a display of an HTML document linked to the HTML document of FIG. 49 having a same structure as the HTML document of FIG. 49 on a Web browser;

FIG. 51 shows an HTML description corresponding to the display of FIG. 49; and FIG. 52 shows an HTML description corresponding to the display of FIG. 50.

DETAILED DESCRIPTION OF THE EMBODIMENTS

Various embodiments of the present invention will be described in detail with reference to the accompanying drawings. In this specification, the semi-structured documents include documents or other materials described in HTML (hypertext markup language), SGML (standard generalized markup language), XML (extensive markup language), etc. The explanation of the embodiments is based on HTML documents if not specifically mentioned. Note that following embodiments are able to be applied to SGML document and XML document with appropriate modification. An input form provided by search engine for information retrieval consist of HTML document. Therefore, the HTML documents include these input forms furnished for search engines in following explanation. The present invention is widely applicable to applications that utilize plural HTML documents that differ mutually in various aspects connected together through open networks. For example, the present invention is applicable to electronic commerce or information retrieval on electronic libraries and electronic catalogues.

The principle of the semi-structured document integrated retrieval scheme of the present invention will be explained with reference to FIGS. 3 and 4.

Figure 1:
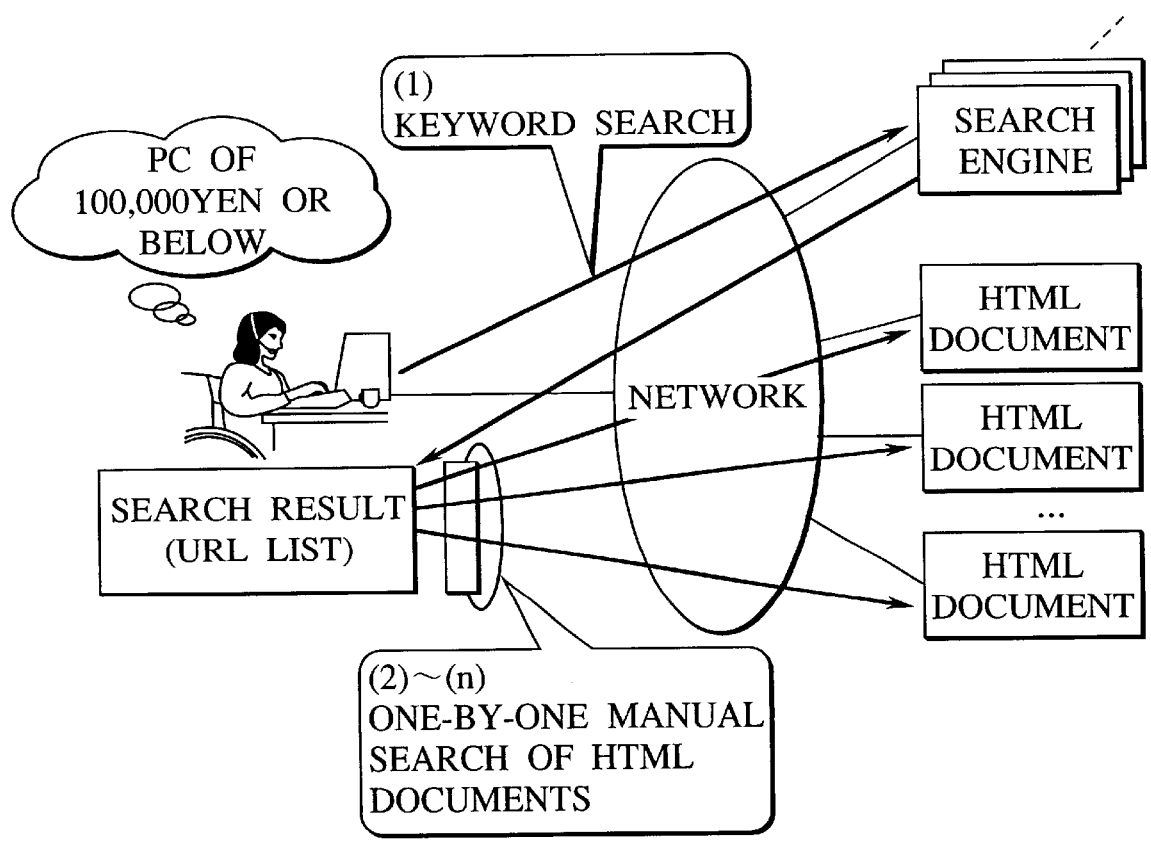
FIG. 1 shows a sequence of processes for searching HTML documents for required information according to a prior art.
Figure 2:
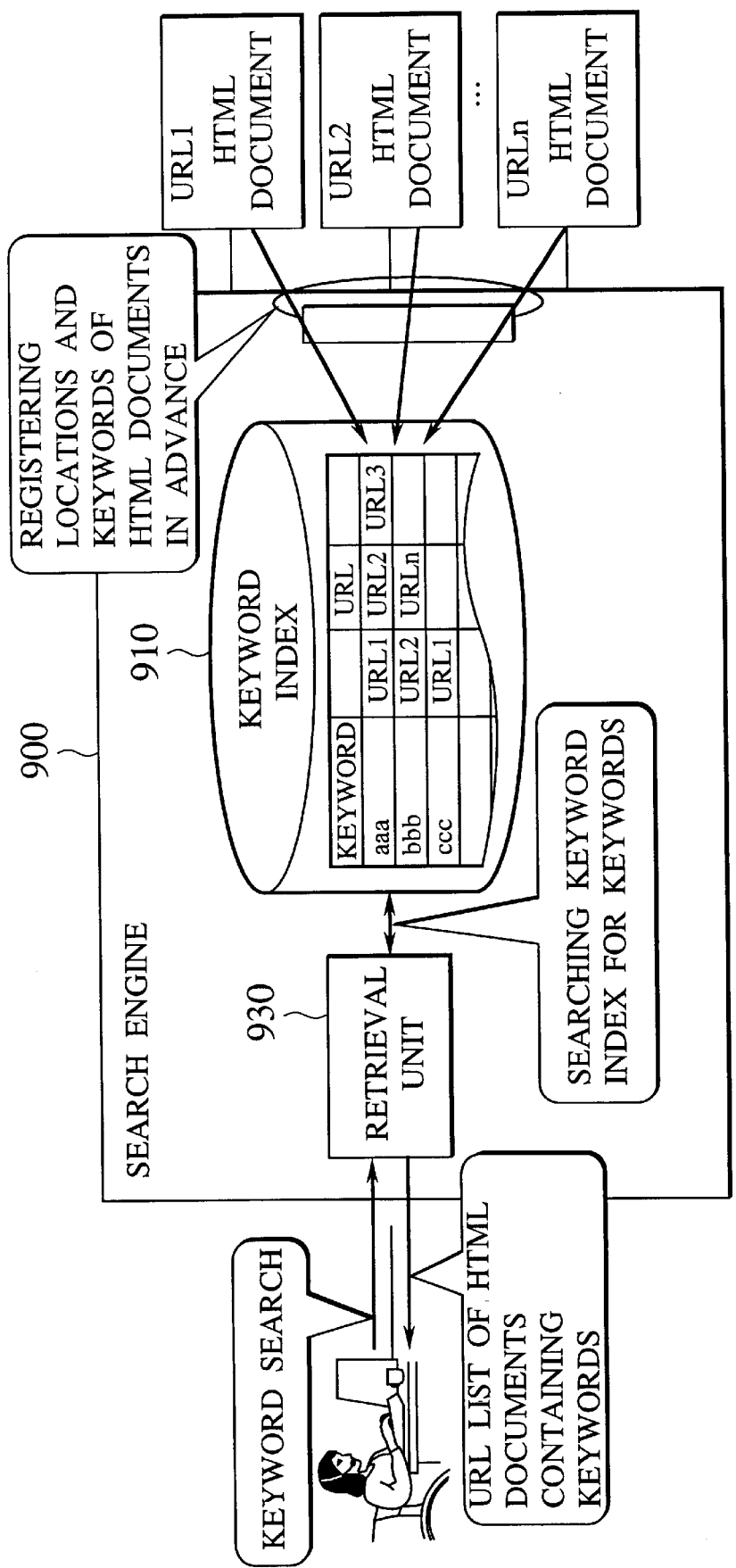
FIG. 2 shows the principle of a conventional search technique.
Figure 3:
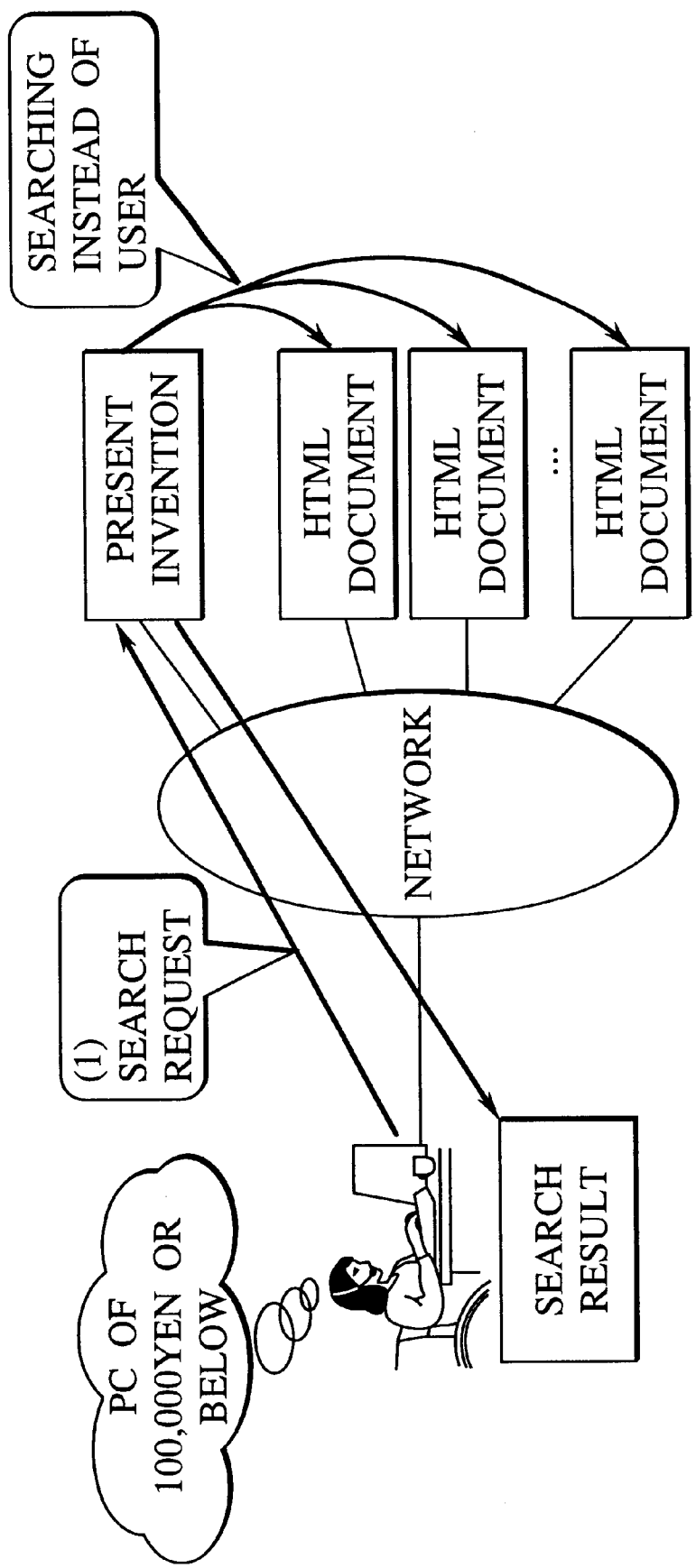
FIG. 3 shows a sequence of processes for searching HTML documents for required information according to an integrated retrieval technique of the present invention.

FIG. 3 shows an image of operation sequence for user according to the present invention. In FIG. 3, a user enters a search request for, for example, a PC of 100,000 yen or below into an apparatus that realizes the integrated retrieval scheme of the present invention. The apparatus flexibly retrieves required information involved in HTML documents and provides the user with a collective search result. The search request may be made not only in conventional keywords but also in simple syntactical query statement consists of search item and search condition. Namely, the present invention is capable of handling conditional search such as a search for a PC of "100,000 yen or below."

Unlike structural data structured item by item such as RDB data, the HTML documents are so called semi-structured data in which data is structured in certain degree by using tags, even though HTML documents are plain text basically. For example, data group related to one subject such as table, list and clause involved in HTML document may be contained over several HTML documents, or several data groups may be contained in a single HTML document. It is hard to conditionally retrieve item data corresponding to a given item from these data groups. Search engines have HTML-described input forms that may have fixed search entries or search entries that must be filled in for indication of search condition. The apparatus of the present invention is capable of flexibly coping with a user's search request and providing the user with a collective search result.

Figure 4:
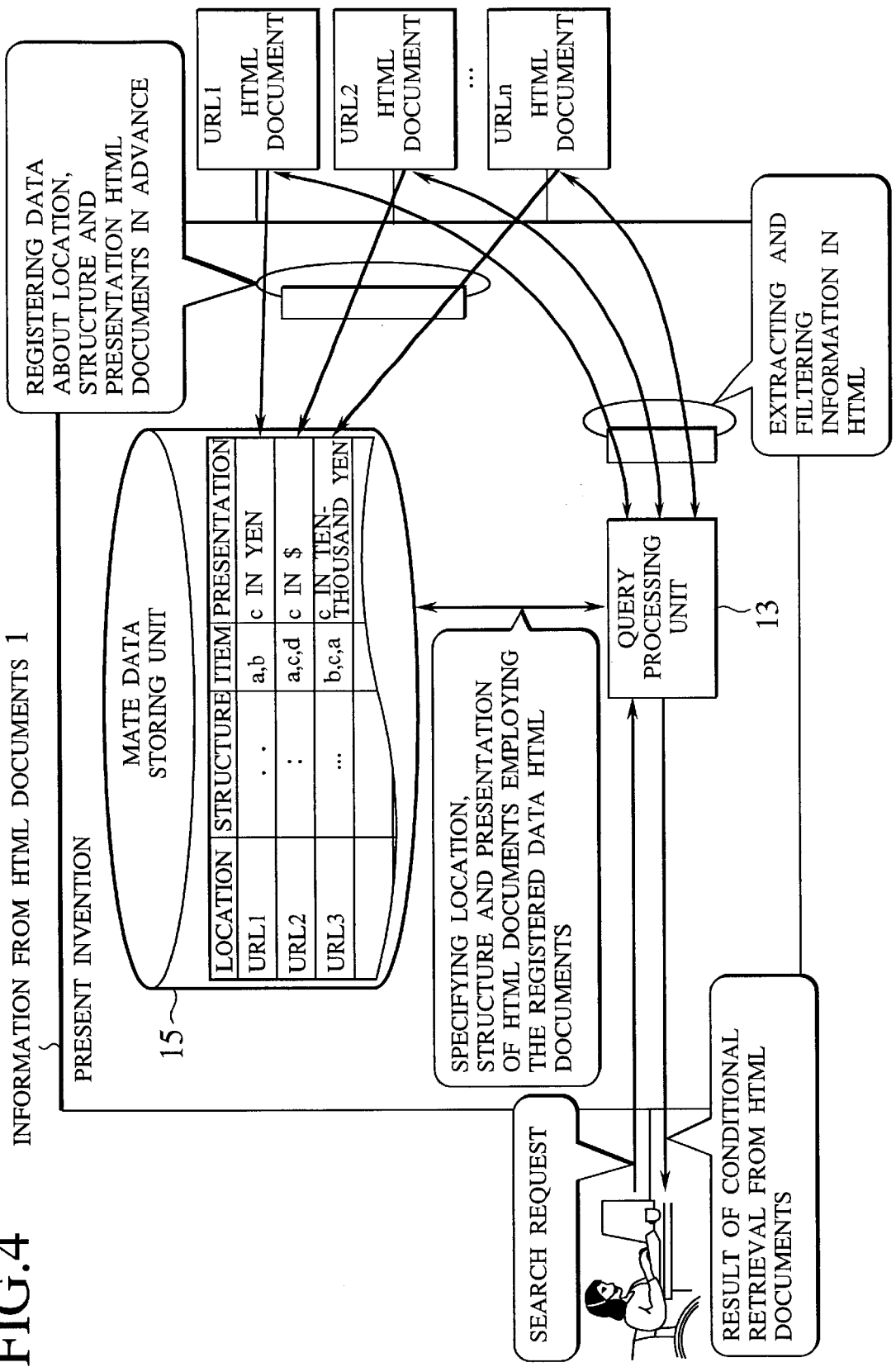
FIG. 4 shows the principle of the integrated retrieval of the present invention.

FIG. 4 shows the principle of the apparatus of the present invention. The apparatus 1 has a HTML document storing unit 15 for storing meta data about HTML documents. The meta data includes the locations, document structures, presentation styles, etc., of the HTML documents for each HTML document. The locations of the HTML documents are, for example, URLS. The document structure data of the HTML documents specifies the structures of partial structure such as tables, lists and clauses contained in the HTML documents and is used to map element data in the tables and lists to items to be extracted. More particularly, the document structure of a given HTML document indicates that data pieces corresponding to the items to be extracted contained in the HTML document are separated from one another with delimiters such as tags and slashes. Each field between delimiter such as tag and slash in the HTML documents is related to an item and is managed in table format etc., by the storing unit 15. Data pieces contained in the HTML documents frequently employ different presentation styles even if they fall in the same weaning. The presentation styles stored in the storing unit 15 indicate each one of presentation style employed by the HTML documents.

A user of the apparatus 1 enters a search request into a query processing unit 13. The query processing unit 13 refers to the meta data stored in the HTML document storing unit 15 and specifies the locations, document structures, and presentation styles of HTML documents related to the search request. The query processing unit 13 acquires the HTML documents, extract information from the HTML documents with the use of the specified meta data, and conditionally processes the extracted information if necessary. Therefore, the apparatus 1 provides the user with a collective search result involved in HTML documents in presentation styles that are optimum for the user. Namely, with a single search request, the user is able to collectively receive required information from the HTML documents scattering over networks through the apparatus 1 of the present invention. This improves search efficiency and reduces traffic congestion in the networks.

In this way, first, the apparatus of the present invention manages the structure information of semi-structured documents such as HTML documents connected to open networks and retrieves requested information item by item from plural HTML documents. Second, the apparatus of the present invention is capable of retrieving necessary information from Web information documents through search engines without bothering the user with differences among the search methods of various Web sources.

First Embodiment

An HTML document information integrated retrieval apparatus of the first embodiment according to the present invention concerning semi-structured document information retrieval scheme will be explained with reference to FIGS. 5 to 16.

HTML documents are scattering over open networks and have individual document structures, presentation styles, and partial structures such as tables containing different elements. The first embodiment retrieves required information involved in various HTML documents and provides a user with a collective search result in presentation styles that are optimum for the user.

A concept regarding the presentation styles and terms used for the embodiments will be explained first. HTML documents employ different presentation styles to express even the same meaning. For example, the price of a product is expressed like "¥1,000," "one thousand yen," or "1,000 yen" depending on the writers of HTML documents. Terms employed by this specification will be explained.

A domain is equal to one presentation style. For example, "1,000 yen" for a price is a with-yen presentation style that forms a domain, and "¥1,000" is a with-¥ presentation style that forms a domain.

A domain group is a collection of domains related to the same meaning. For example, prices form a domain group, and dates (year, month, day) form a domain group.

A user input domain is a domain related to a user's search request input. For example, the with-yen presentation style for a price forms a user input domain, and the Christian era for a date with "/" as a delimiter forms a user input domain.

A user output domain is a domain related to a search result for a user. For example, the with-¥ presentation style for a price forms a user output domain, and an abbreviated date for a date with "." as a delimiter forms a user output domain.

A user domain covers user input and output domains.

A local domain is a domain in a given HTML document. For example, the with-yen presentation style for a price forms a local domain.

A domain conversion function is a function for converting a user input domain into a local domain, or a local domain into a user output domain.

Figure 5:
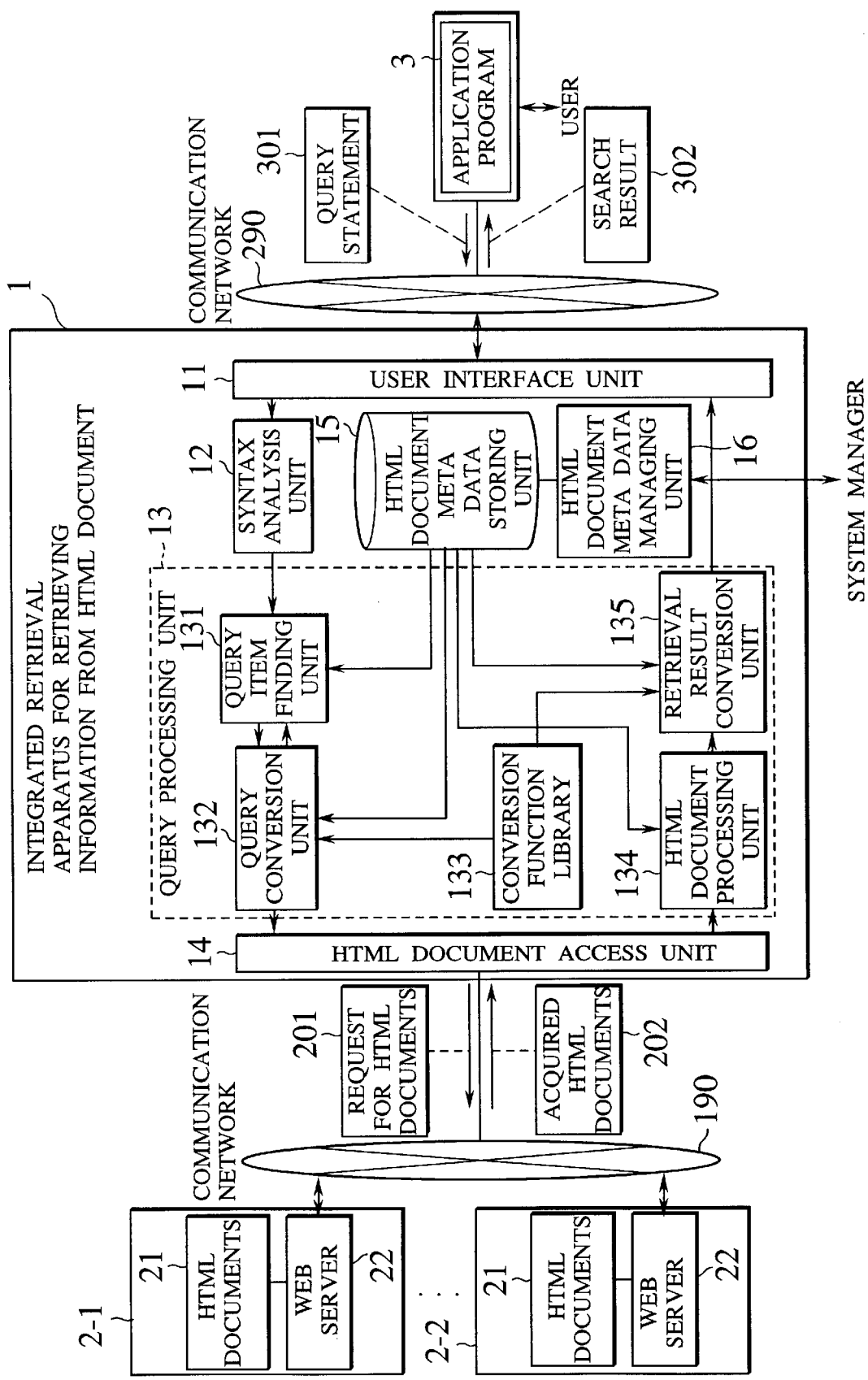
FIG. 5 shows a HTML document integrated retrieval apparatus according to a first embodiment of the present invention.

If different user input domains, user output domains, and local domains are involved, the difference will be resolved by the domain conversion functions. FIG. 5 is a block diagram showing a configuration of HTML document information integrated retrieval apparatus according to the first embodiment.

In FIG. 5, the apparatus 1 of the first embodiment has a user interface unit 11, a syntax analysis unit 12, a query processing unit 13, an HTML document access unit 14, an HTML document meta data storing unit 15, and an HTML document meta data managing unit 16. The query processing unit 13 has a query item finding unit 131, a query conversion unit 132, a conversion function library 133, an HTML document processing unit 134, and a retrieval result conversion unit 135.

The user interface unit 11 receives a search request (query statement) consisting of search items and search conditions entered by a user through an application program 3. The syntax analysis unit 12 analyzes the syntax of the query statement received by user interface unit 11. The query processing unit 13 collectively retrieves required information items involved in HTML documents. More precisely, the query item finding unit 131 finds locations of items specified in the query statement. The query conversion unit 132 converts each user input domain in the query statement into a corresponding local domain and forms queries to be transmitted from the HTML document access unit 14. The HTML document access unit 14 receives HTML documents that are returned in response to the queries. The HTML document processing unit 134 acquires information from the received HTML documents and processes the information according to the query statement. For example, the HTML document processing unit 134 selects information pieces corresponding to the search items, filters the selected information pieces according to the search conditions, and provides a search result. The retrieval result conversion unit 135 converts local domains in the retrieval result into user output domains. The HTML document access unit 14 collects HTML documents scattering over open networks and converts information contained in the HTML documents into information of a unified form such as a table. The HTML document access unit 14 is connected to HTML document servers 2-1, 2-2, and the like. Each of the HTML document servers has HTML documents 21 and a Web server 22 that manages the HTML documents 21. The HTML document meta data storing unit 15 stores meta data about the HTML documents. The meta data includes the document structure, presentation styles, items, etc., of each HTML document to be retrieved. Items information in a partial structure such as a table in a given HTML document frequently disagree with items stipulated in a search request in a one-to-one manner. In this case, the meta data relates the plural elements of which each one corresponds to the partial structure to the item in a search request. Note that an element is information piece contained in HTML document hereinafter. The HTML document meta data manager 16 stores new meta data in the storing unit 15 and deletes and changes the meta data in the storing unit 15. The HTML document meta data manager 16 is implemented in, for example, an editor and is controlled by a system manager.

Figure 6:
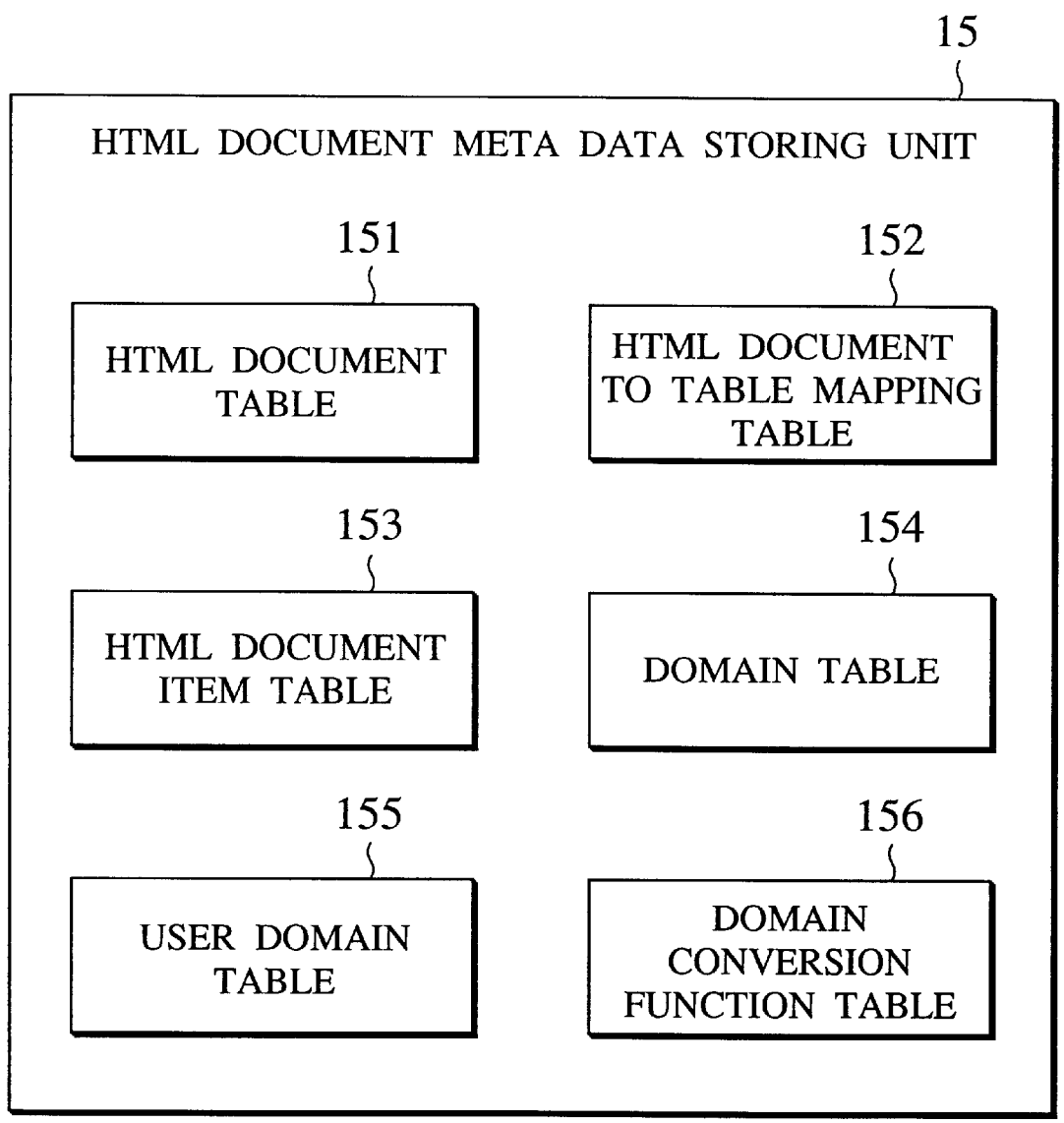
FIG. 6 shows the structure of a HTML document meta data storing unit arranged in the apparatus of FIG. 5.

FIG. 6 shows the structure of table of the HTML document meta data storing unit 15. The HTML document storing unit 15 stores meta data in the form of tables. An HTML document table 151 stores the locations of HTML documents. An HTML document to table mapping table 152 stores data used to convert elements contained in the HTML documents into items forming a table. An HTML document item table 153 stores the attributes of items contained in the HTML documents for each item. A domain table 154 stores the presentation styles of domains. A user domain table 155 stores the input and output domains of each user. A domain conversion function table 156 stores domain conversion functions.

Processing steps carried out by the apparatus 1 of the first embodiment will be explained. The processing steps are carried out in two phases, i.e., a preparatory phase of FIG. 7 and an execution phase of FIG. 8. In the preparatory phase, a managing person prepares meta data about HTML documents through the HTML document meta data manager 16 before starting the execution phase.

Figure 7:
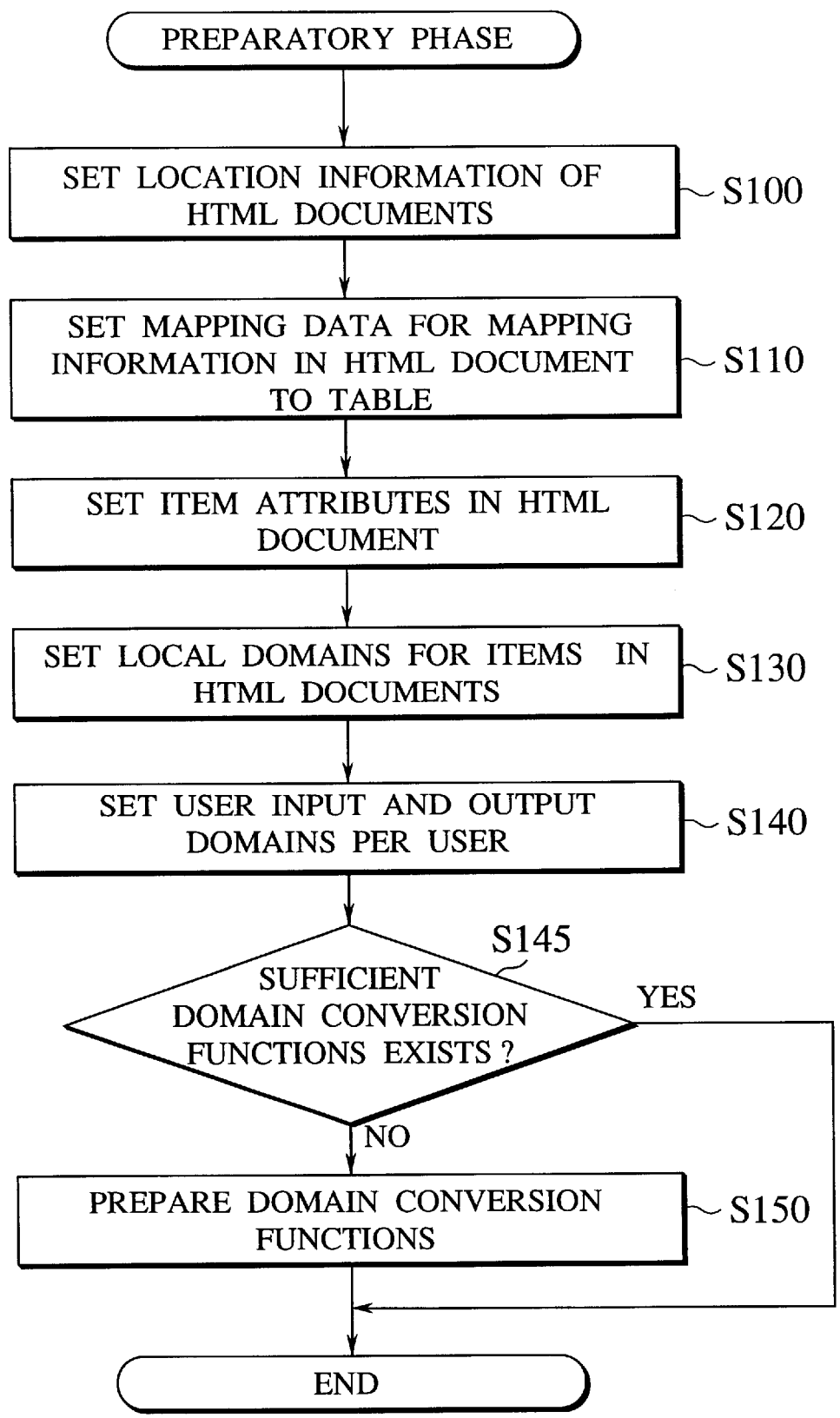
FIG. 7 is a flow chart showing a preparatory phase of the first embodiment.

In the preparatory phase of FIG. 7, step S100 stores the locations of HTML documents in the HTML document table 151. Step S110 sets, in the HTML document to table mapping table 152, data used to convert elements contained in the HTML documents into a table consisting of items. Step S120 sets, in the item table 153, the attributes of items contained in the HTML documents. Step S130 sets, in the domain table 154, local domains of the items contained in the HTML documents. Step S140 sets, in the user domain table 155, the input and output domains of each user. Step S145 checks to see if there are sufficient conversion functions for converting a given domain into another. If not, step S150 prepares necessary domain conversion functions and stores them in the domain conversion function table 156.

The execution phase of FIG. 8 will be explained. In step S200, the syntax analysis unit 12 analyzes the syntax of a query statement entered by a user, and the query item finding unit 131 finds the locations of search items specified by the user in the HTML document table 151. In step S210, the query item finding unit 131 finds HTML documents that have all of the search items in the HTML document item table 153. In step S220, the query conversion unit 132 gets user input domains, user output domains, and local domains corresponding found items from the tables 154 and 155. In step S225, the query conversion unit 132 checks to see if the user input domains and local domains of the search items agree with each other. If they do not agree in an item, the query conversion unit 132 gets a domain conversion function for the item from the domain conversion function table 156 and converts the user input domain of the item into a corresponding local domain with respect to the items whose domain differs as described above in step S230. In step S240, the HTML document processing unit 134 gets HTML documents through the HTML document access unit 14, extracts items for the search items from the HTML documents, and prepares a search result. In step S245, the HTML document processing unit 134 checks to see if the user output domain and local domain of each item agree with each other. If they do not agree in an item, the HTML document processing unit 134 gets a domain conversion function for the item from the domain conversion function table 156 and converts the local domain of the item into a corresponding user output domain with respect to the items whose domain differs as described above in step S250. In step S260, the search result having proper user output domains is supplied to the user through the user interface unit 11.

The details of the process procedure of the first embodiment will be explained with reference to FIGS. 9 to 16.

FIG. 9A shows an exemplary display on a Web browser of an HTML document concerning with product information of a shop A, and FIG. 10A shows that of a shop B. FIG. 9B shows an HTML description that provides the display of FIG. 9A, and FIG. 10B shows an HTML description that provides the display of FIG. 10A.

The shop A employs a tag TABLE to form a table to show their product information. The shop B employs a tag OL to form a clause of their product information.

The shop A displays each price with the with-¥ presentation style, and the shop B shows each price with the with-yen presentation style.

The shop A has a product name as an element, and the shop B has a maker name and a product name as elements.

The location of the product information of the shop A is a URL of http://www.shop-a.co.jp/products.html, and that of the shop B is a URL of http://www.shop-b.co.jp/shouhin.html.

In this way, the HTML documents of FIGS. 9A and 9B have different document structures, presentation styles, and elements.

(1) Preparatory Phase

Step 5100 of FIG. 7 sets the locations of the HTML documents in the document table 151. In this example, the locations are page names and URLs as shown in FIG. 11.

(a) Shop A
Page name: Shop-A
URL: http://www.shop-a.co.jp/products.html
(b) Shop B
Page name: Shop-B
URL: http://www.shop-b.co.jp/shouhin.html Step S110 sets data for converting elements contained in the HTML documents into a table in the HTML document to table mapping table 152. In this example, page names, record start points, and ways of extracting columns 1 to 4 are set as shown in FIG. 12. For the prices of the shop B, only numerals and the positions including "," are picked up.

(a) Shop A
Page name: Shop-A
Record start: line starting with <TR><TD>
Column 1: "Shop A" fixed Column 2: between 1st <TD> and 1st "/" in record start line
Column 3: between 1st "/" and 1st </TD> in record start line
Column 4: between 2nd <TD> and 2nd</TD> in record start line
(b) Shop B
Page name: Shop-B
Record start: line starting with <L1>
Column 1: "Shop B" fixed Column 2: between 1st <L1> and 1st "/" in record start line
Column 3: between 1st "/" and 2nd "/" in record start line
Column 4: between 2nd "/" and 1st "yen" in record start line Step 120 stores the attributes of the items involved in the HTML documents in the HTML document item table 153. In this example, the page names, corresponding columns, column titles, and data types are stored as shown in FIG. 13. Only price information is defined as a numeric value in data type. Values of this data type are used for comparison when processing the search conditions.

(a-1) Page Shop-A, column 1
Page name: Shop-A
Column: column 1
Column title: shop name
Data type: character string
(a-2) Page Shop-A, column 2
Page name: Shop-A
Column: column 2
Column title: maker name
Data type: character string
(a-3) Page Shop-A, column 3
Page name: Shop-A
Column: column 3
Column title: product name
Data type: character string
(a-4) Page Shop-A, column 4
Page name: Shop-A
Column: column 4
Column title: price
Data type: numeric value
(b-1) Page Shop-B, column 1
Page name: Shop-B
Column: column 1
Column title: shop name
Data type: character string
(b-2) Page Shop-B, column 2
Page name: Shop-B
Column: column 2
Column title: maker name
Data type: character string
(b-3) Page Shop-B, column 3
Page name: Shop-B
Column: column 3
Column title: product name
Data type: character string
(b-4) Page Shop-B, column 4
Page name: Shop-B
Column: column 4
Column title: price
Data type: numeric value Step S130 sets local domain names for the elements contained in the HTML documents in the domain table 154 as shown in FIG. 14. No local domains are set for the shop names, maker names, and product names of the shops A and B because they are represented with optional character strings. On the other hand, local domains for the product prices of the shops A and B are set as follows according to the value set in the HTML document item table 153. The local domain is registered in the HTML document item table 153.

Domain group: price

Local domain of Shop-A: with-¥ presentation style

Local domain of Shop-B: value-comma presentation style

Step S140 sets user input and output domains for each user in the user domain table 155 as shown in FIG. 15. A user A enters a shop name, maker name, and product name in HTML presentation styles and requests a search output in the same presentation styles, and therefore, no user input and output domains for these items are set. For a price domain group, assume that the user A requests as follows:

Input: with-yen presentation style

Output: with-yen presentation style

This domain is registered in the domain table 154, and the user domain is registered in the user domain table 155. The user domain may contain different user input and output domains.

Step S150 sets domain conversion functions in the domain conversion function table 156 as shown in FIG. 16. In this example, there are three domains including the value-comma presentation style, with-yen presentation style, and with-¥ presentation style. Accordingly, mutual conversion functions between the user input domains and the local domains and between the user output domains and the local domains are set as follows and are stored in the domain conversion function table 156. These conversion functions are also stored in the conversion function library 133.

(a) Conversion from Value-comma Presentation Style into With-yen Presentation Style Conversion function name: Num2Yen( )

Conversion input domain: value-comma presentation style

Conversion output domain: with-yen presentation style (b) Conversion from With-yen Presentation Style into Value-comma Presentation Style Conversion function name: Yen2Num( )

Conversion input domain: with-yen presentation style

Conversion output domain: value-comma presentation style (c) Conversion from Value-comma Presentation Style into With-¥ Presentation Style Conversion function name: Num2¥( )

Conversion input domain: value-comma presentation style

Conversion output domain: with-¥ presentation style (d) Conversion from With-¥ Presentation Style into Value-comma Presentation Style Conversion function name: ¥2Num( )

Conversion input domain: with-¥ presentation style

Conversion output domain: value-comma presentation style (e) Conversion from With-yen Presentation Style into With-¥ presentation Style Conversion function name: Yen2¥( )

Conversion input domain: with-yen presentation style

Conversion output domain: with-¥ presentation style (f) Conversion from With-¥ Presentation Style into With-yen Presentation Style Conversion function name: ¥2Yen( )

Conversion input domain: with-¥ presentation style

Conversion output domain: with-yen presentation style (2) Execution Phase

The user A issues a search request consisting of, for example, a query statement containing search item and search condition:

Search items: shop name, maker name, product name, and price

Search conditions: price<200,000 yen

The syntax analysis unit 12 analyzes the query statement entered by the user. In step S200 of FIG. 8, the query item finding unit 131 finds the search items. The search items are the shop name, maker name, product name, and price. The query item finding unit 131 finds the column titles corresponding to the search items in the HTML document item table 153 and provides the following records:

(a) Shop Name

Page Shop-A, column 1, data type of character string

Page Shop-B, column 1, data type of character string (b) Maker Name

Page Shop-A, column 2, data type of character string

Page Shop-B, column 2, data type of character string (c) Product Name

Page Shop-A, column 3, data type of character string

Page Shop-B, column 3, data type of character string (d) Price

Page Shop-A, column 4, data type of numeric value

Page Shop-B, column 4, data type of numeric value

In step S210, the query item finding unit 131 finds the names of HTML documents that contain all of the search items and provides the following two combinations. The URLs of the combinations are obtained from the HTML document table 151.

(A) Combination 1

(a) Page name: Shop-A (b) Elements

Shop name: column 1, character string

Maker name: column 2, character string

Product name: column 3, character string

Price: column 4, numeric value (c) URL http://www.shop-a.co.jp/products.html (B) Combination 2

(a) Page name: Shop-B (b) Elements

Shop name: column 1, character string

Maker name: column 2, character string

Product name: column 3, character string

Price: column 4, numeric value (c) URL http://www.shop-b.co.jp/shouhin.html

In step S220, the query conversion unit 132 acquires user domains and local domains corresponding to the search items. The local domains are obtained from the HTML document item table 153. For any item having a local domain, a domain group is found in the domain table 154, and user domains of the same domain group are retrieved from the user domain table 155. As a result, the following combinations are obtained:

(A) Combination 1

(a) Page name: Shop-A (b) Elements

Shop name: no local domain

Maker name: no local domain

Product name: no local domain

Price: local domain of with-¥ presentation style user input domain of with-yen presentation style user output domain of with-yen presentation style (B) Combination 2
(a) Page name: Shop-B
(b) Elements
   Shop name: no local domain
   Maker name: no local domain
   Product name: no local domain
   Price: local domain of value-comma presentation style
     user input domain of with-yen presentation style
     user output domain of with-yen presentation style For any item having different user input and local domains, the query conversion unit 132 gets a domain conversion function having corresponding conversion input and output domains and converts the user input domain into a local domain in step S230. In each of the above-mentioned combinations, the user input domain differs from the local domain in the price presentation style. Accordingly, proper domain conversion functions are fetched from the domain conversion function table 156 with the conversion input and output domain names serving as keys.

(A) Combination 1
  Conversion input domain: with-yen presentation style
  Conversion output domain: with-¥ presentation style
  Conversion function name: Yen2¥( )
(B) Combination 2
  Conversion input domain: with-yen presentation style
  Conversion output domain: value-comma presentation style
  Conversion function name: Yen2Num( )

The conversion functions are executed for the combinations 1 and 2 to obtain the following:
(A) Combination 1
  Yen2¥(200,000 yen)=¥200,000
(B) Combination 2
  Yen2Num(200,000 yen)=200,000

The query conversion unit 132 generates the following queries for the HTML document access unit 14:
(A) Combination 1
(a) Page name: Shop-A
(b) Search request
  Search items: shop name, maker name, product name, and price
  Search conditions: price<¥200,000
(B) Combination 2
(a) Page name: Shop-B
(b) Search request
  Search items: shop name, maker name, product name, and price
  Search conditions: price<200,000

With these queries, the HTML document access unit 14 acquires the HTML documents and generates a search result in step S240. The HTML document processing unit 134 extracts information from the HTML documents located at obtained URL and linked URL according to the HTML document to table mapping table 152, filters the information if there are search conditions, and provides the following search result:
(A) Combination 1
(a) Page: Shop-A
(b) Search result
  Shop name: Shop A, maker name: Maker A, product name: PC1, price: ¥170,000
  Shop name: Shop A, maker name: Maker B, product name: PC101, price: ¥198,000
(B) Combination 2
(a) Page: Shop-B
(b) Search result
  Shop name: Shop B, maker name: Maker A, product name: PC1, price: 168,000

If there is any item having different user output domain and local domain, the retrieval result conversion unit 135 acquires a corresponding domain conversion function and converts the local domain into a proper user output domain in step S250. In each of the above-mentioned combinations, the local domain and user output domain of the price differ from each other, and therefore, the retrieval result conversion unit 135 searches the domain conversion function table 156 for a proper conversion function according to conversion input and output domains stored in the domain conversion function table 156.

(A) Combination 1
  Conversion input domain: with-¥ presentation style
  Conversion output domain: with-yen presentation style
  Conversion function name: ¥2Yen( )
(B) Combination 2
  Conversion input domain: value-comma presentation style
  Conversion output domain: with-yen presentation style
  Conversion function name: Num2Yen( )

The conversion functions are executed to obtain the following:
(A) Combination 1
  ¥2Yen(170,000)=170,000 yen
  ¥2Yen(¥198,000)=198,000 yen
(B) Combination 2
  Num2Yen(168,000)=168,000 yen In the last, the user interface unit 11 provides the user with the following search result in step S260:
  Shop name: Shop A, maker name: Maker A, product name: PC1, price: 170,000 yen
  Shop name: Shop A, maker name: Maker B, product name: PC101, price: 198,000 yen
  Shop name: Shop B, maker name: Maker A, product name: PC1, price: 168,000 yen As explained above, the first embodiment manages meta data about information contained in HTML documents scattering over open networks, to realize collective search on the information contained in the plural HTML documents and generate a search result without regard to differences among the HTML documents. The first embodiment manages information document by document. If an HTML document to be searched is added, corrected, or deleted, the first embodiment simply adds, corrects, or deletes the HTML document only itself. The first embodiment easily handles an exponentially increasing number of HTML documents as search objects.

Search result from each HTML document is obtained as item data being conditionally processed item by item. Therefore, HTML document processing-unit 134 may merge plural search results from plural HTML documents so as to prepare one piece of search result, and filter this search result as a whole if necessary.

HTML documents scattering over open networks have different document structures, elements, presentation styles, etc. Even with these variations, the first embodiment is capable of retrieving required information from the different HTML documents, converting the retrieved information into a unified form for each user, and returns a collective search result to the user. Compared with the prior arts, the first embodiment eliminates the time and labor of manual work and drastically improves search efficiency. The first embodiment is applicable to electronic commerce in flexibly retrieving product information with search conditions of, for example, the names and prices of shops that offer lowest prices for a given product. Consequently, the first embodiment contributes to vitalize fair electronic commerce.

Second Embodiment

An Internet information integrated retrieval apparatus of the second embodiment according to the present invention concerning semi-structured document information retrieval scheme will be explained with reference to FIGS. 17 to 38.

Open networks including the Internet involve search engines having specific input forms. The second embodiment retrieves necessary information with search conditions from the open networks through plural search engines irrespective of differences in the document structures, essential input items, and presentation styles of the search engines and collectively acquires a search result from the search engines.

The second embodiment employs the same concept and terms as the first embodiment. As explained above, HTML documents employ various presentation styles depending on their writers and users. For example, some HTML documents express Kanagawa prefecture, an area in Japan, as "Kanagawa-ken" and others simply as "Kanagawa."

"Kanagawa-ken" is a domain of a with-ken presentation style when expressing an area. "Chinese food" is a domain of a with-food presentation style when expressing a genre. The area and genre form each a domain group. If a user enters a query statement with "Kanagawa-ken" and "Chinese food," this query statement involves user input domains of the with-ken presentation style for area and with-food presentation style for genre. If a search output for a user has "Kanagawa-ken" and "Chinese food," this search output includes user output domains of the with-ken presentation style for area and with-food presentation style for genre. If a search result extracted from an HTML document includes "Kanagawa-ken," this search result involves a local domain of the with-ken presentation style for area.

If a given domain group involves different user input domain, user output domain, and local domain, the second embodiment resolves the difference by using domain conversion functions like the first embodiment.

FIG. 17 shows the Internet information integrated retrieval apparatus 10 according to the second embodiment. This second embodiment is a modification of the first embodiment to replace the query processing unit 13 of FIG. 15 an integrated retrieval unit 130. The integrated retrieval unit 130 additionally has an essential item finding unit 136, a retrieval pattern judging unit 137, and a retrieval result processing unit 138. The apparatus 10 has a user interface unit 11, a syntax analysis unit 12, the integrated retrieval unit 130, an HTML document meta data storing unit 150, an HTML document meta data manager 160, and an HTML document access unit 14. The integrated retrieval unit 130 according to the second embodiment has a query item finding unit 131, a query conversion unit 132, a conversion function library 133, the essential item finding unit 136, the retrieval pattern testing unit 137, the retrieval result processing unit 138, and a retrieval result conversion unit 135.

The same parts as those of the first embodiment shown in FIG. 5 are represented with like reference marks if not specifically mentioned, and their explanations are not repeated. The user interface unit 11 receives a query statement entered by a user through a user application program 3. The query statement consists of search items and search conditions. The syntax analysis unit 12 analyzes the syntax of the query statement received by the user interface unit 11. The integrated retrieval unit 130 collectively retrieves required information involved in HTML documents that are managed by search engines for the search items. More precisely, the query item finding unit 131 finds the location of the search items in HTML documents indicated in the query statement. The essential item finding unit 136 checks scarce items in the input forms of search engines and determines search engines to use. The retrieval pattern judging unit 137 determines an optimum search pattern for the query statement and optimizes the search statement for the search engines accordingly. The query conversion unit 132 converts user input domains in the query statement into local domains and prepares queries to be transmitted by the HTML document access unit 14 to the search engines retrieval. The retrieval result processing unit 138 processes information contained in the acquired HTML documents according to the query statement (e.g., selecting items for search items and filtering data for search condition). The retrieval result processing unit 138 filters the information extracted from the HTML documents and suppresses conditional processes carried out by the search engines. The retrieval result conversion unit 135 converts local domains with respect to the presentation style of retrieved items in the output of the retrieval result processing unit 138 into user output domains. The HTML document access unit 14 transmits the prepared queries to the search engines and acquires HTML documents scattering over open networks through the search engines. The second embodiment converts information contained in the acquired HTML documents into a unified form such as a table appropriate for the user. The HTML document access unit 14 is connected to search engines 20-1, 20-2, and the like through a communication network 190. Each of the search engines consists of an engine unit 23 and a database 24. The HTML document meta data storing unit 150 stores information for each search engine such as the locations of the search engines and the document structures, presentation styles, and elements of HTML documents. The HTML document meta data manager 160 adds, deletes, and changes meta data in the HTML document storing unit 150. The HTML document meta data manager 160 is implemented in, for example, an editor, to control the registration and management of the meta data in the HTML document storing unit 150.

FIG. 18 shows the details of the HTML document meta data storing unit 150. The unit 150 stores meta data in the form of tables like the meta data storing unit 15 of FIG. 6. An HTML document table 151 stores the locations of HTML documents. An HTML document to table mapping table 152 stores data for converting elements contained in each HTML document into a table consisting of items. An HTML document item table 153 stores the attribute of each item contained in each HTML document. A domain table 154 stores the presentation styles of domains. A user domain table 155 stores the input and output domains of each user. A domain conversion function table 156 stores domain conversion functions. An essential item table 157 stores essential input items of the input form of each search engine. The retrieval pattern judging unit 137 has a retrieval pattern matrix table of FIG. 30 used to determine a retrieval pattern for a given search engine and optimizes a user query statement for the search engine. The retrieval pattern matrix table 139 of FIG. 30 may be stored in the meta data storing unit 150.

The details of operation of the apparatus 10 of the second embodiment and the details of the setting of contents for the tables will be explained. The operation is carried out in two phases, i.e., a preparatory phase of FIG. 21 preparing data such as presentation style before retrieval and an execution phase of FIG. 31.

FIGS. 19A, 19B, and 19C show examples of input forms of search engines. FIG. 20 shows an HTML description corresponding to the input form of FIG. 19B.

(1) Preparatory Phase

Figure 21:
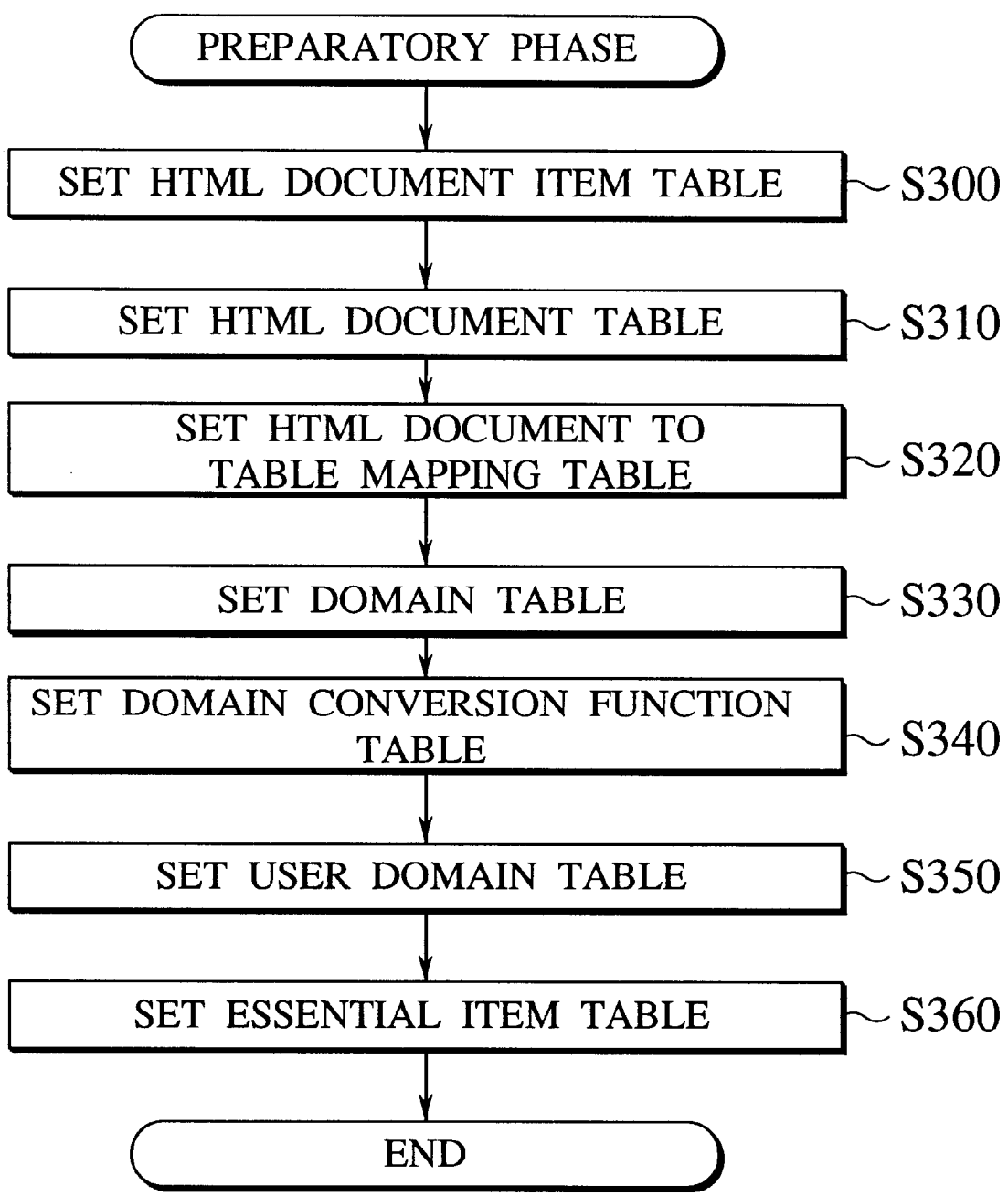
FIG. 21 is a flow chart showing a preparatory phase of the second embodiment.

FIG. 21 shows steps carried out in the preparatory phase. Step S300 sets the HTML document item table 153 as shown in FIG. 22. HTML document item table 153 manages following items for each input form of the search-engine. A column "Page name" contains the names of input forms of the search engines. A column titled "Column" contains column numbers related to the HTML document mapping table 152. A column "Item name" contains items contained in the input forms of the search engines. A column "Availability" contains data to indicate whether or not the data items are obtainable from the retrieval result of the corresponding search engines. A column "Conditional" contains data to indicate whether or not the data items are conditionally processable by the corresponding search engines. A column "Data type" contains data to indicate whether each data item is a numeric value or a character string and is used when evaluating and filtering information. A column "Name tag" contains a NAME-tag if a corresponding data item employs a selection form. A column "Local domain" contains local domains for corresponding column numbers.

Step S310 sets the HTML document table 151 as shown in FIG. 23. The HTML document table 151 manages the locations of the input forms of the search engines. A column "Page name" contains the names of the input forms of the search engines. A column "Search engine URL" contains URLs serving as location information of the search engines.

Step S320 sets the HTML document to table mapping table 152 as shown in FIG. 24. The HTML document to table mapping table 152 maps information contained in HTML documents returned by the search engines to a table. A column "Page name" contains the names of the input forms of the search engines. A column "Record start" contains tags that indicate each start line of contents in a corresponding HTML document. Columns titled "Column 1" to "Column 5" contain each tags that indicate a portion corresponding to a data item to be retrieved in each obtained HTML document. The column titles "Column 1" to "Column 5" of FIG. 24 correspond to the columns 1 to 5 listed in the column titled "Column" of the HTML document item table 153 for page-A shown in FIG. 22. Step S330 sets the domain table 154 as shown in FIG. 25. The domain table 154 manages domain groups and the domains as local domains information set in the HTML document item table 153.

Step S340 sets the domain conversion function table 156 as shown in FIG. 26. The domain conversion function table 156 manages domain conversion functions. A column "Conversion function name" contains the name of each function for converting a specific domain into another domain. A column "Domain group" contains each group of domains of the same kind. A column "Conversion input domain" contains each input domain for each domain conversion function. A column "Conversion output domain" contains each output domain for each domain conversion function. A column "Library name" contains the name of file of the conversion function library 133.

Step S350 sets the user domain table 155 as shown in FIG. 27. The user domain table 155 manages the input and output domains indicated by each user per domain group. A column "User name" contains the name of each user that issues a search request. A column "User input domain" contains user input domains used by the users for certain domain group. A column "User output domain" contains user output domains used by the users for each domain group.

Figures 28, 29:
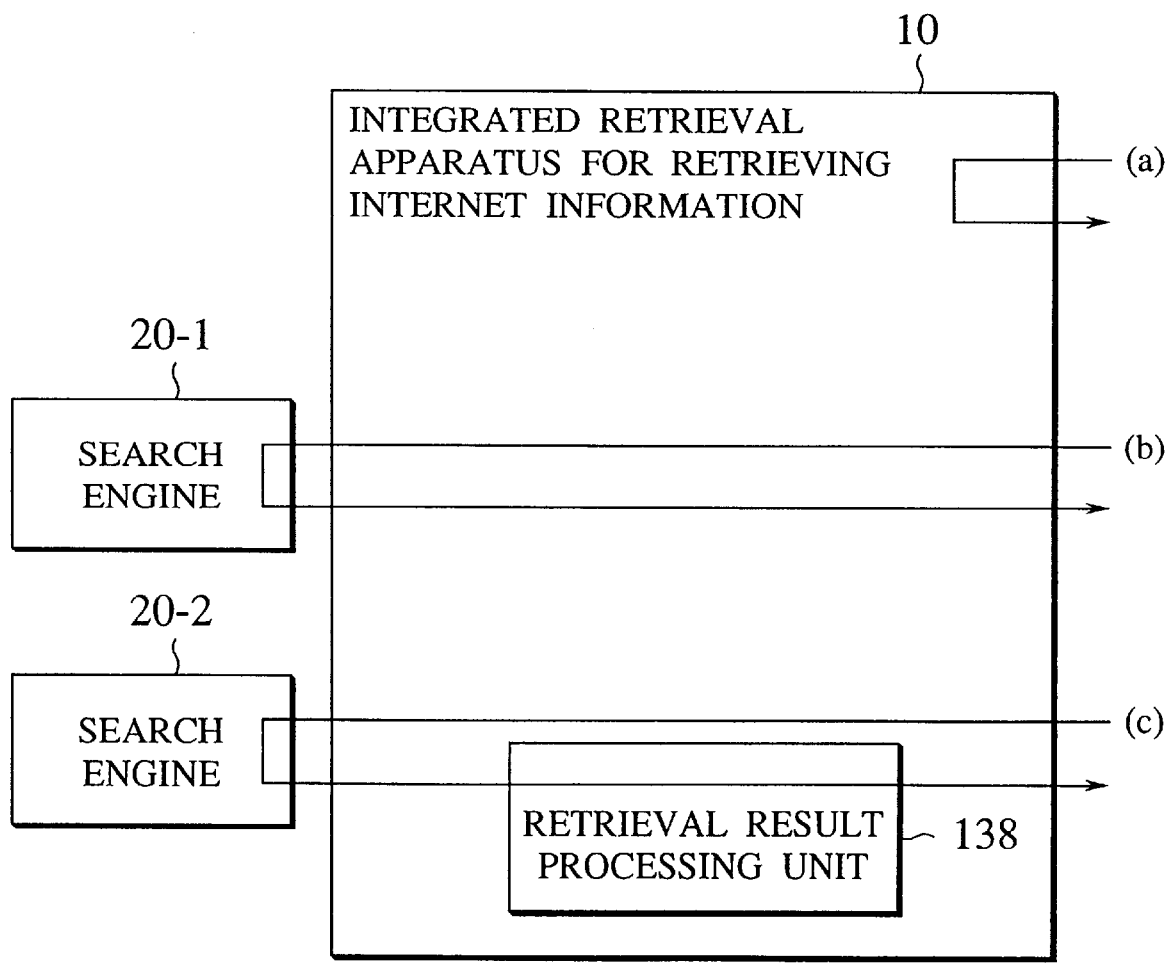
FIG. 28 shows an example of an essential item table stored in the storing unit of FIG. 18.
FIG. 29 shows simplified relationships between the apparatus of the second embodiment and search engines in processing of search request.

Step S360 sets the essential item table 157 as shown in FIG. 28. Input form of some search engine has essential items to be filled in. The essential item table 157 manages such essential items. A column "Page name" contains the names of the input forms of the search engines. A column "Essential item" contains essential items that must be filled in.

(2) Execution Phase

Figure 31:
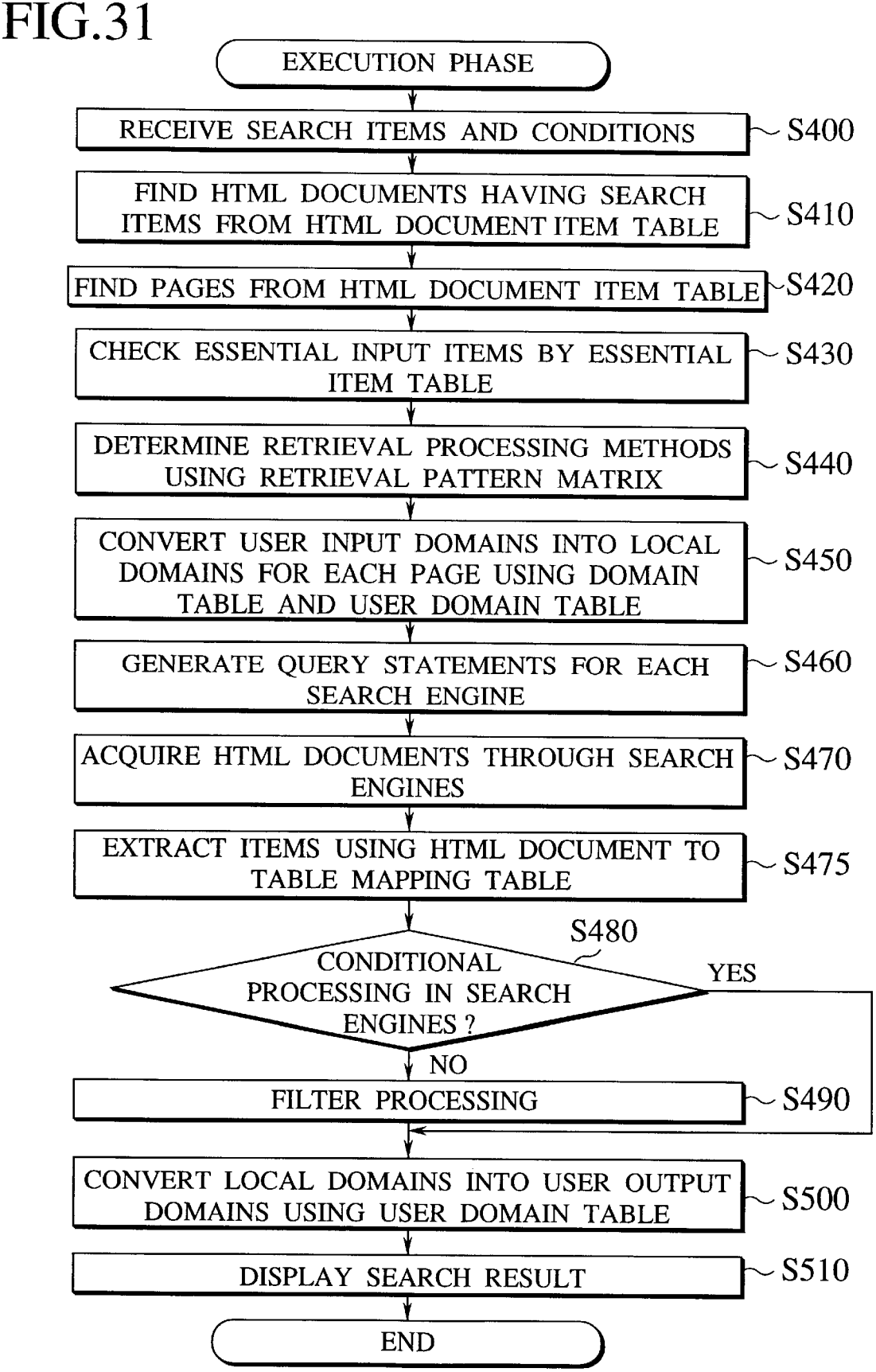
FIG. 31 is a flow chart showing an execution phase of the second embodiment.

FIG. 31 shows steps carried out in the execution phase of the second embodiment.

For example, a user wants to know the names and telephone numbers of Japanese food restaurants in Kanagawa prefecture. For this, a search request is made with simple syntax query statement an SQL statement containing SELECT and WHERE clauses.

In step S400, the user interface unit 11 receives the query statement. The user who made the query is the user 1 shown in FIG. 27, and search items are "Shop name" and "Phone number" with search conditions of "area=Yokohama city" and "genre=Japanese food." The query statement is as follows:

SELECT Shop name, phone number WHERE area= "Yokohama city" and genre="Japanese food" (1-1)

In step S410, the query item finding unit 131 refers to the HTML document item table 153 of FIG. 22 and finds search engines that have the data items corresponding to the search items and conditions. FIG. 32 shows the search engines thus found.

In step S420, the query item finding unit 131 refers to the document table 151 according to the result of step S410 and specifies pages that have the items "Shop name," "Phone number," "Area," and "Genre." Then, the search engines of Page-A, Page-B, and Page-C are selected.

In step S430, the essential item finding unit 136 refers to the essential item table 157 of FIG. 28, checks the essential items of the search engines, and narrows the search engines to be used. Some search engines have essential items to be filled in. Thus, among the search engines in found location provided by step S420, the essential item finding unit 136 exclude search engine that has essential item except for the indicated item as search condition. The query statement (1-1) has the conditional items of "Area" and "Genre." In connection with them, the search engine of Page-A has an essential input item "Genre" that agrees with the search condition item "Genre." Accordingly, the search engine of Page-A is adoptable. The search engine of Page-B has an essential input item "Area" that corresponds to the search condition item "Area," and therefore, the search engine of Page-B is also adoptable. The search engine of Page-C has essential input items "Area" and "Genre," and therefore, is adoptable.

On the other hand, assume that query statement as follows is entered:

SELECT shop name, phone number WHERE area= "Yokohama city" (1-2)

In this case, in the query item finding unite 131 Page-A, Page-B, Page-C are selected as search engine in found location referring to the HTML document item table 152, while these three engine have items "shop name", "phone number" and "area".

Next, in the essential item finding unit 136 selected search engines by the query item finding unit 131 are narrowed as follows.

Page-A set genre as essential item. It means designation for item "genre" is essential for retrieval for Page-A, so that retrieval from Page-A fails unless genre is designated. Genre is not designated in the search condition, i.e., where clause in the query statement (1-2), accordingly the essential item finding unite 136 excludes Page-A among candidates.

Page-C set both genre and are as essential item, so that Page-C is excludes among candidates.

On the contrary, Page-B set area as essential item, the "area" is designated in where clause, so that Page-B is selected as a search engine to be retrieved.

Note that, when transmitting the above query statement (1-2) to a search engine that does not have essential item, the search engine may be searched even if "area" is designated in where clause, as the search engine (page) does not handle essential conditional item. Accordingly, the essential item finding unit 136 selects the search engine as a search engine to be retrieved.

Returning to the query statement (1-1), at this time, the following SQL statements according to the query statement (1-1) are prepared for the selected search engines:

Page-A:
SELECT shop name, phone number WHERE area= "Yokohama city" and genre="Japanese food" (2-1)

Page-B:
SELECT shop name, phone number WHERE area= "Yokohama city" and genre="Japanese food" (2-2)

Page-C:
SELECT shop name, phone number WHERE area= "Yokohama city" and genre="Japanese food" (2-3)

In step S440, the retrieval pattern judging unit 137 refers to the retrieval pattern matrix of FIG. 30 and determines retrieval methods. The retrieval pattern matrix will be explained. FIG. 29 shows a simplified relationship between the apparatus of the second embodiment and search engines. There are three retrieval patterns (a), (b), and (c) for processing a search request entered by a user. The pattern (a) returns the search request to the user without processing it. The pattern (b) conditionally processes the search request by the search engines. The pattern (c) processes the search request by the search engines and filters the process result by the apparatus 10 of the second embodiment. The retrieval pattern matrix of FIG. 30 is used to select one of the three patterns for each search item in a given query statement. The retrieval pattern judging unit 137 refers to the retrieval pattern matrix and determines retrieval strategies. In FIG. 30, a column "Item" under a title "Search request" contains each item to retrieve specified by, for example, a SELECT clause in an SQL statement. A column "Condition" under the "Search request" contains each search condition specified by, for example, a WHERE clause in the SQL statement. A column "Item" under a title "search engine" contains each item returned by a search engine as a retrieval result. A column "Condition" under the "Search engine" contains each condition set in a search request and stipulated in the input form of each search engine. The column "Item" under the "Search engine" corresponds to the column "Availability" in the HTML document item table 153 of FIG. 22, and the column "Condition" under the "Search engine" corresponds to the column "Conditional" in the HTML document item table 153. A column "Return as it is" contains data to indicate whether or not a search condition value is returned as it is without processing a search item. A column "Return from search engine" contains data to indicate whether or not a result provided by a search engine for a given search item is returned as it is. A column "Process by search engine" contains data to indicate whether or not a given search condition is processed by a search engine. A column "Filtering" contains data to indicate whether or not a retrieval result returned from a search engine with respect to a given search condition is processed by the retrieval result processing unit 138 of the apparatus 10.

For example, the search statement (1-1) stipulates "Shop name" with the SELECT clause but not with the WHERE clause. The item "Shop name" is "o" in "Item" and "x" in "Condition" in "Search request" of FIG. 30. Referring to the HTML document item table 153 of FIG. 22, the input form of the search engine Page-A of FIG. 19A is capable of receiving "Shop name" as a search condition and returning it as a search result. Accordingly, the search engine of FIG. 19A is "o" in each of "Item" and "Condition" in FIG. 30. Namely, "Shop name" of the search engine of FIG. 19A corresponds to the fourth record from the top of FIG. 30. Accordingly, the process pattern of the Page-A for "Shop name" returns information provided by the search engine as an item without conditionally processing the information because a condition is not stipulated in SQL.

On the other hand, "Area" is specified in the WHERE clause but not in the SELECT clause in the search statement (1-1). Accordingly, "Area" is "x" in "Item" and "o" in "Condition" in "Search request" of FIG. 30. According to the HTML document item table 153 of FIG. 22, the Page-A of FIG. 19A is unable to receive a condition for "Area" but is able to return a search result for "Area." Accordingly, "Area" of the Page-A is "o" in "Item" and "x" in "Condition" in "Search engine" of FIG. 30. As a result, "Area" of the Page-A corresponds to the eighth record from the top of FIG. 30. Namely, the process pattern of the Page-A for "Area" returns no information because it is not stipulated in the SELECT clause of the SQL statement, and the search engine is unable to carry out to conditional process. Instead, the retrieval result processing unit 138 carries out a filtering process to return a retrieval result. Similar processes are carried out for the Page-A on "Phone number" and "Genre" specified in the SQL statement (1-1), to derive a matrix of FIG. 33 from the matrix of FIG. 30.

Namely, FIG. 33 shows a result of determination of items and conditions to be set for the Page-A with respect to the search request. It is understood from a column "Process by search engine" that the search condition for "Genre" must be transmitted to the Page-A. It is understood from a column "Filtering" that a search result for "Area" from the Page-A must be filtered according to the condition set for "Area." It is understood from a column "Return from search engine" that "Shop name" and "Phone number" provided by the Page-A must be returned as they are to the user.

The Page-A accepts search conditions for "Shop name" and "Genre," while the query statement (1-1) stipulates a search condition only for "Genre." Accordingly, "Japanese food" is set for "Genre" when sending a query to the Page-A. Thereafter, the retrieval result processing unit 138 carries out a filtering process to select data in the items "Shop name" and "Phone number" whose "Area" contains "Yokohama city" and prepares a retrieval result. Consequently, the pattern (c) is applied to the Page-A, and the query statement (2-1) is rewritten as follows:

Filtering condition: "Area"="Yokohama city"
SELECT shop name, phone number WHERE genre= "Japanese food" (3-1)

Similarly, query statements for the Page-B and Page-C are prepared. FIG. 34 shows a result of examination on the Page-B. It is understood from a column "Process by search engine" that the search condition for "Area" is transmitted to the Page-B. It is understood from a column "Filtering" that a search result provided by the Page-B is filtered according to the condition set for "Genre." It is understood from a column "Return from search engine" that information pieces to be provided by the Page-B for "Shop name" and "Phone number" are returned as they are to the user. Consequently, the pattern (c) is applied to the Page-B, and the query statement (2-2) is rewritten as follows:

Filtering condition: "Genre"="Japanese food"

SELECT shop name, phone number WHERE area="Yokohama city" (3-2)

FIG. 35 shows a result of examination on the Page-C. It is understood from a column "Process by search engine" that the search conditions for "Area" and "Genre" are transmitted to the Page-C. It is understood from a column "Filtering" that a search result provided by the Page-C is not filtered. It is understood from a column "Return from search engine" that information pieces to be provided by the Page-C for "Shop name" and "Phone number" are returned as they are to the user. Consequently, the pattern (b) is applied to the Page-C, and the query statement (2-3) is rewritten as follows:

Filtering condition: none

SELECT shop name, phone number WHERE area="Yokohama city" and "Genre"="Japanese food" (3-3)

In step S450 of FIG. 31, the query conversion unit 132 converts the query statements provided by the retrieval pattern judging unit 137 into queries having local domains appropriate for the search engines. The query conversion unit 132 acquires user input domains and local domains for items whose local domain is set among items in a search engine corresponding to the specified item in search condition from the tables 153 and 155, as shown in FIG. 36. For each item having different user input domain and local domain, the query conversion unit 132 fetches a proper conversion function from the conversion function library 133 according to the domain conversion function table 156 and converts the user input domain into a corresponding local domain. For example, the item "Area" in the Page-B has a local domain of "Page-B-City." A user input domain for this domain group is a domain "with-city (SHITSUKI)" from the tables 154 and 155. Accordingly, the query conversion unit 132 refers to the domain conversion function table 156, fetches a conversion function "Shi2ValueB( )," and converts "Yokohama city" into "07" that indicates the seventh entry in a selection list in the input form of the Page-B.

The item "Genre" of the Page-C has a local domain of "Page-C-Dishes." A user input domain for this domain group is a domain "with-food (RYOURITSUKI)" from the tables 154 and 155. As a result, the query conversion unit 132 refers to the domain conversion function table 156, fetches a conversion function "Ryouri2ValueC( )," and converts the "Japanese food" into "1" that indicates the first entry in a selection list of the input form of the Page-C.

At this time, the queries for the search engines and filtering conditions for the retrieval result processing unit 138 are as follows:

Page-A:

Filtering condition: "Area"="Yokohama city"

SELECT shop name, phone number WHERE genre="Japanese food" (4-1=3-1)

Page-B:

Filtering condition: "Genre"="Japanese food"

SELECT shop name, phone number WHERE area="07" (4-2)

In the statement (4-2), the area "Yokohama city" has been changed to "07."

Page-C:

SELECT shop name, phone number FROM Page-C WHERE area="Yokohama city" and genre="1" (4-3)

In the statement (4-3), the genre "Japanese food" has been changed to "1."

In step S470 of FIG. 31, the HTML document access unit 14 issues the following queries specific to the search engines according to the query statements prepared in step S460. Thereafter, the search engines carry out retrieval processes.

Page-A:

Filtering condition: "Area"="Yokohama city"

"GET http://www.Page-a.co.jp/search-shop.cgi?category=Japanese food http/1.0" (5-1)

Page-B:

Filtering condition: "Genre"="Japanese food"

"GET http://www.Page-b.co.jp/search-shop.cgi?area=07 http/1.0" (5-2)

Page-C:

"GET http://www.Page-c.co.jp/search-shop.cgi?area=Yokohama city & category=1 http/1.0" (5-3)

In step S475, the search engines return data retrieved from HTML documents, and the retrieval result processing unit 138 extracts necessary information therefrom according to the HTML document to table mapping table 152. FIG. 37A shows a display on a browser of the HTML document returned by the search engine of the Page-B, and FIG. 37B shows an HTML description corresponding to the display of FIG. 37A. Retrieval results provided by the search engines are as follows:

(a) Page name: Page-A

Filtering condition: "Area"="Yokohama city"

Retrieval result:
    Shop name: A1, Area: Yokohama city
    Phone number: (045) *-**
    Shop name: A2, Area: Yokosuka city
    Phone number: (0468) -** (6-1)

(b) Page name: Page-B

Filtering condition: "Genre"="Japanese food"

Retrieval result:
    Shop name: B1, Genre: Japanese food
    Phone number: 045-*-**
    Shop name: B2, Genre: Chinese food
    Phone number: 045-*-**
    Shop name: B3, Genre: Chinese food
    Phone number: 045-*-** (6-2)

(c) Page name: Page-C

Filtering condition: none

Retrieval result:
    Shop name: C1, Phone number: 045-*-**
    Shop name: C2, Phone number: 045-*-** (6-3)

In step S480, the retrieval result processing unit 138 finds any item that needs a filtering process according to the retrieval pattern matrix of FIG. 30. In step S490, the retrieval result processing unit 138 carries out the filtering process on the retrieval result of each search engine. In the example, the Page-A pays no attention to the condition "Area"="Yokohama city" and the Page-B pays no attention to the condition "Genren"="Japanese food." Accordingly, these retrieval results are filtered to extract data that satisfies "Area"="Yokohama city" and "Genre"="Japanese food" as follows:

(a) Page name: Page-A

Filtering result

Shop name: A1, Phone number: (045) \*\*\*-\*\*\*\* (7-1)

(b) Page name: Page-B

Filtering result

Shop name: B1, Phone number: 045-\*\*\*-\*\*\*\*(7-2)

(c) Page name: Page-C

Filtering result

Shop name: C1, Phone number: 045-\*\*\*-\*\*\*\*

Shop name: C2, Phone number: 045-\*\*\*-\*\*\*\*(7-3=6-3)

In step S500, the retrieval result conversion unit 135 acquires the user output domains and local domains for the specified search items whose local domain is stipulated from the tables 153, 154 and 155, as shown in FIG. 38. For any item having different user output domain and local domain, the retrieval result conversion unit 135 converts the local domain into a corresponding user output domain according to a conversion function fetched from the domain conversion function table 156. For example, the item "Phone number" of the Page-A has a local domain and a user output domain that are identical to each other, and therefore, no conversion is carried out. The item "Phone number" of each of the Page-B and Page-C has a local domain "Tel-Bar" and a user output domain "Tel-Paren." As a result, the retrieval result conversion unit 135 fetches a conversion function "Bar2Paren( )" from the domain conversion function table 156 to convert "045-\*\*\*-\*\*\*\*" into "(045) \*\*\*-\*\*\*\*." The local domains of Page-B and Page-C are converted into user output domains as follows:

Input: "045-\*\*\*-\*\*\*\*" (Domain: Tel-Bar)

Domain conversion function: Bar2Paren( )

Output: "(045) \*\*\*-\*\*\*\*" (Domain: Tel-Paren)

In step S510, the user interface unit 11 returns an collective search result prepared from above mentioned retrieval result mentioned below to the user, and the application program 3 of the user displays the result in the form of, for example, a table.

Shop name: A1, Phone number: (045) \*\*\*-\*\*\*\*

Shop name: B1, Phone number: (045) \*\*\*-\*\*\*\*

Shop name: C2, Phone number: (045) \*\*\*-\*\*\*\*

Shop name: C2, Phone number: (045) \*\*\*-\*\*\*\*

As explained above, the second embodiment prepares search requests for a plurality of search engines scattering over open networks by individually managing the objects of the input forms of the search engines, thereby resolving differences among the interface of the search engines and flexibly retrieving necessary information through the search engines. Information involved in HTML documents returned from plural search engines differ from one another in their document structure, presentation style, input form, etc., and therefore, search engines return results in various ways. The second embodiment resolves these differences and provides a user with a search result in an integrated form its difference derives from that of search engines. The second embodiment improves search efficiency and reduces traffic in the networks. The second embodiment individually registers and manages the input forms of various search engines and easily controls meta data about HTML documents related to the search engines.

Third Embodiment

An HTML document information extraction apparatus of the third embodiment according to the present invention concerning semi-structured document information retrieval scheme will be explained with reference to FIGS. 39 to 53.

The third embodiment retrieves information item by item from HTML documents scattering over open networks. This third embodiment is a modification of the first embodiment to form the HTML document processing unit 134 of the first embodiment of FIG. 5 with a template analysis unit 1341, a URL-template table 1342, and a template processing unit 1343. The arrangement of FIG. 39 may singularly be achieved or may properly be combined with the arrangements of the first and second embodiments. For example, the arrangement of FIG. 39 may have the syntax analysis unit 12, item finding unit 131, query conversion unit 132, HTML document meta data storing unit 15, HTML document meta data manager 16, etc., of FIGS. 5 and 17.

To extract information item by item from HTML documents, the third embodiment manages the locations and document structures of HTML documents for each HTML document. More precisely, the third embodiment manages the locations of HTML documents by using URLs of the HTML documents. Its proxy information may be managed by using a proxy setting file 141 that stores proxy server names and proxy port numbers related to the HTML documents. The document structures of HTML documents include information of partial structures such as tables, lists and clauses contained in the HTML documents, that is, items to be extracted are delimited by delimiters such as tags and slashes, for example. The document structure information includes the attributes of columns and data types for each items. The third embodiment stores and manages these document structures of HTML documents as item name, extraction text specifying part and data type of the item name etc., in template files 1345. The data type of a given item may be a character or a numeric value and is used when processing data related to the item. The URL-template table 1342 relates the template files 1345 to the URLs or file names of HTML documents to be searched. Each HTML document is converted into a unified form such as a table according to extraction text specifying parts of a corresponding template file. The template files 1345 correspond to the HTML document to table mapping table 152 and HTML document item table 153 of FIGS. 6 and 18.

When a user specifies a URL or a file name, the third embodiment refers to the proxy setting file 141, URL-template table 1342, and template files 1345. For example, if a user specifies a URL, the third embodiment refers to the proxy setting file 141 to acquire a corresponding HTML document name, refers to the URL-template table 1342 to acquire a template file name, scans the acquired HTML document one line or plural lines at a time from the top thereof, compares the scanned contents with extraction text specifying parts of the template file 1345, and extracts information item by item accordingly. At this time, the third embodiment checks to see if there is a link to the next page in the template file 1345. If there is, the third embodiment acquires the URL or file name of the next page and extracts data from the page. The third embodiment repeats these operations to completely read links. The third embodiment maps the extracted information to a table item by item by item watching referring to the template file 1345, shapes the information according to data types stipulated in the template file 1345, and returns the names of the items from which the information has been extracted and the shaped and itemized information to the user. Unlike the prior arts, the third embodiment optionally defines the data types of elements (information pieces) extracted from HTML documents so that conditionally processes the information pieces according to search conditions. Similar to the first and second embodiments, the third embodiment is capable of processing the presentation styles of information according to a user's request.

Figure 39:
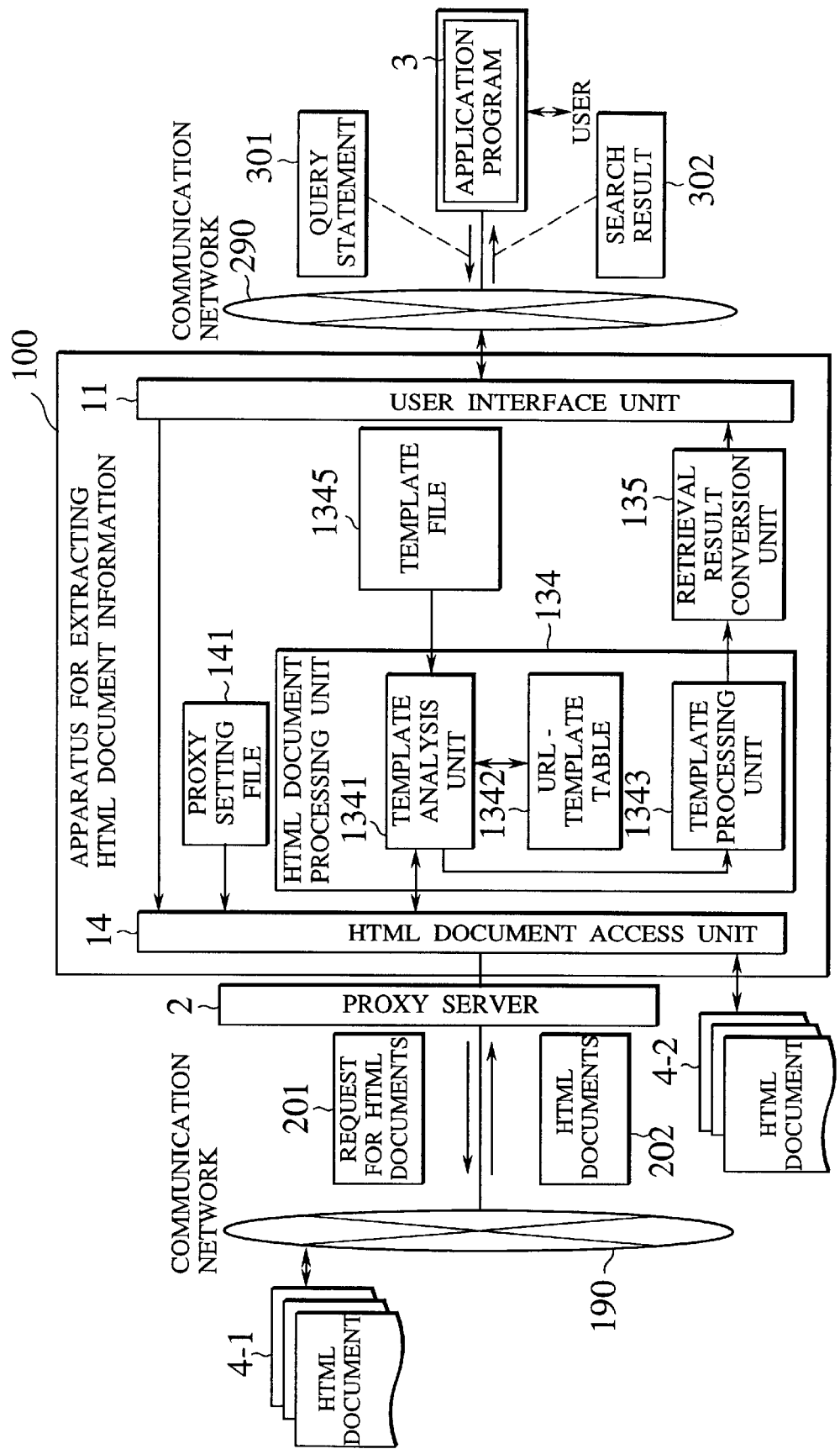
FIG. 39 shows a HTML document information extraction apparatus according to a third embodiment of the present invention.

FIG. 39 is a block diagram showing the HTML document information extraction apparatus according to the third embodiment.

In FIG. 39, the apparatus 100 of the third embodiment as a user interface unit 11, an HTML document access unit 14, the proxy setting file 141, an HTML document processing unit 134, the template files 1345, and a retrieval result conversion unit 135. The HTML document processing unit 134 has the template analysis unit 1341, URL-template table 1342, and template processing unit 1343. A user enters a query statement 301 through an application program 3. According to the query statement 301, the apparatus 100 accesses HTML documents directly or through a proxy server 2, acquires information from the HTML documents, processes the information according to template files 1345, and returns a search result 302 to the user.

HTML documents are scattering over networks and have different locations, tags, and information elements. To cope with these differences and extract information item by item from them, the apparatus 100 individually manages the locations and document structures of the HTML documents for each HTML document. In addition, the apparatus 100 provides a search result in a unified form such as a table.

Figures 40, 41:
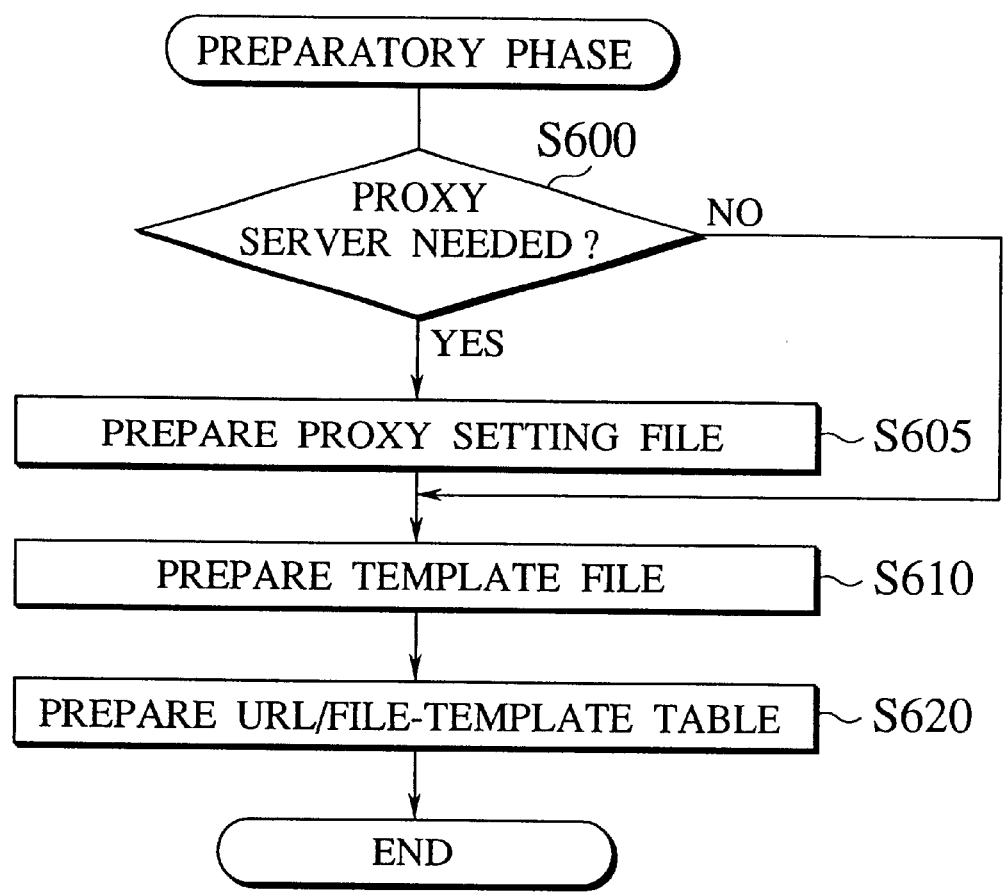
FIG. 40 is a flow chart showing a preparatory phase of the third embodiment.
FIG. 41 shows an example of a proxy setting file.

The user interface unit 11 receives the query statement 301 entered by the user through the application program 3 and transmits it to the HTML document access unit 14. According to a URL or a file name provided by the user interface unit 11, the HTML document access unit 14 refers to the proxy setting file 141 and acquires an HTML document (4-1, 4-2). The HTML document is transferred to the template analysis unit 1341. If the HTML document contains link data, the template analysis unit 1341 extracts linked URLs according to which the HTML document access unit 14 refers to the proxy setting file 141 if necessary and acquires HTML documents (4-1, 4-2) having the linked URLs. FIG. 41 shows an example of the proxy setting file 141 that specifies proxy server names and proxy port numbers, that is, the location data of proxy server necessary for acquiring HTML documents and is referred by the HTML document access unit 14. FIG. 42 shows an example of one of the template files 1345 that specifies parts that are extractable as items and items to be extracted in extraction text specifying parts. The template file also specifies data types of the items to be extracted. The template files 1345 are referred by the template analysis unit 1341. The URL-template table 1342 shown in FIG. 43 manages relationships between URLs or file names and template files and is referred by the template analysis unit 1341. The template analysis unit 1341 fetches the name of a template file corresponding to the query statement 301 from the URL-template table 1342. At the same time, the template analysis unit 1341 refers to the template file 1345 for the acquired name of the template file and analyzes and acquires extractable parts, items to be extracted, and data types of the items to be extracted of the HTML document in query. The acquired data is transferred from the template analysis unit 1341 to the template processing unit 1343. The template analysis unit 1341 also determines whether or not there are linked URLs in the template file 1345. If there are linked URLs, they are transferred to the HTML document access unit 14, which acquires linked HTML documents accordingly. According to the extractable parts, the items to be extracted, and the data types of the items to be extracted from the template analysis unit 1341, the template processing unit 1343 extracts item data from the HTML documents.

The retrieval result conversion unit 135 receives the extracted information and the data types thereof from the template processing unit 1343 and carries out conversion on the extracted information according to the data types. The converted information is sent as a search result 302 to the user through the user interface unit 11.

The apparatus 100 of the third embodiment, or any one of the apparatuses of the first and second embodiments, may be realized with a computer having a CPU, memories, I/O devices, external storage devices, etc., and a medium for recording a program that provides the functions of the present invention when being read by the computer.

The proxy server 2 acts as an intermediary to acquire HTML document specifiable by the apparatus 100 and returns an HTML document (4-1, 4-2) specified by an URL to the apparatus 100. The HTML documents 4-1 and 4-2 are tagged text file constituting home pages scattering over open networks. The application program 3 receives from a user a search request at least containing a URL or file name and search items, gets a search result for the search request from the apparatus 100, and provides the user with the search result.

Processing steps carried out by the apparatus 100 of the third embodiment will be explained. The steps are carried out in a preparatory phase preparing data such as presentation style before retrieval of FIG. 40 and an execution phase of FIG. 44. The preparatory phase of FIG. 40 is prepared by a managing person with the use of, for example, an editor but not by operating the whole of the apparatus 100.

(1) Preparatory Phase

The preparatory phase of FIG. 40 will be explained. Step S605 sets a proxy server name and a proxy port number to form the proxy setting file 141 of FIG. 41, if proxy server needed (S600Y). Step S610 prepares a template file. The template file has a unique name among all template files and contains the following data (FIG. 42):

(a) Items to be Extracted

In formation about items to be extracted corresponds to keyword "Word"

The template file stipulates the names of items from which information pieces are extracted, the data types of the items, and fixed values added to the items. In the example of FIG. 42, the data type is "1" to indicate a character type: Note that the data type may be set according to desired filtering processing such as "3" for a numeric value type, or "4" for a character string adding type. The template file of FIG. 42 includes a linked address (URL's relative path) at the portion headed "Next URL." These pieces of data type and fixed value are needed when adding or deleting information with respect to a search result to be returned to a user.

(b) Text Extraction Specifying Part

Information about text to be extracted corresponds to the portion headed "HTML Template"

A record that contains information to be extracted is copied from a target HTML document (Web page). A required information part is replaced with "$item name$" and each part in the record that can be omitted is replaced with an omit mark ". .".

If a given for HTML document includes partial structure to be handled as character string specifying the end of same tables are set. In the example of FIG. 42, there are first, second and third tables and related items.

If there is any linked URL, character string for specifying the linked URL are set. Thereafter, step S620 prepares the URL-template table 1342 containing URLs or file names and corresponding template file names, as shown in FIG. 43.

(2) Execution Phase

FIG. 44 shows steps in the execution phase for extracting information from items of a given HTML document according to the third embodiment.

In step S700, the user interface unit 11 receives a query statement entered by a user through the application program 3. The query statement includes a URL or a file name and search items. If the query statement include a URL, the HTML document access unit 14 refers to the proxy setting file 141 if the corresponding file 141 is defined (4-1) and acquires an HTML document having the URL. If the query statement contains a file name, a local HTML document having the file name is specified. According to the URL or file name and the contents of the proxy setting file 141, the HTML document access unit 14 acquires an HTML document directly or through the proxy server 2 and receives a corresponding HTML document in step S710.

In step S720, the template analysis unit 1341 checks to see if there is a template file 1345 corresponding to the URL. Namely, the template analysis unit 1341 searches the URL-template table 1342 for the URL or file name stipulated in the query statement. If there is no corresponding template file (Step S720N), the template analysis unit 1341 sends an error message to the user interface unit 11. If there is a corresponding template file, the template analysis unit 1341 fetches the template file from among the template files 1345, analyzes extraction rules stipulated in the template file, and transfers the extraction rules to the template processing unit 1343, in step S730.

In step S740, the template processing unit 1343 extracts information item by item from the HTML document (4-1, 4-2) according to the extraction rules obtained from the template file 1345 and stores the extracted information in a table. In step S750, the template processing unit 1343 analyzes the extraction rules and determines whether or not there is a linked URL. If there is (Step S750Y), the template processing unit 1343 transfers the linked URL to the HTML document access unit 14, which acquires an HTML document having the linked URL. The acquired HTML document with the linked URL is subjected to the steps S730 to S750.

The retrieval result conversion unit 135 refers to the template file 1345 to carry out the following processes on the extracted items of information:
  a) executing no processes on item data whose data type are ruled to display information as it is;
  b) returning fixed values from the retrieval result conversion unit 135 for items whose data type are ruled to have the fixed values even if the HTML document contains no corresponding information;
  c) deleting commas from numeric values for item data whose data type are ruled to do so; and
  d) adding fixed values such as relative URL paths to item data whose data type are ruled to have such additional values.

According to these pieces of data, the retrieval result conversion unit 135 prepares a search result and transmits it to the application program 3 through the user interface unit 11.

FIGS. 45 to 48 show examples of extracting information item by item according to the third embodiment, in which FIG. 45 is a display of an HTML document on a Web browser, FIG. 46 is a part of HTML description corresponding to the display of FIG. 45, and FIG. 47 shows a template file for extracting information item by item from the HTML document of FIGS. 45 and 46. The template file includes items to be extracted, i.e., "racename," "grade," "circle," "mmdd," "distance," "condition," "time," "winhorse," "sex_age," "jockey," "teki (trainer)," and "url." The template file also includes a text extraction specifying part for extracting these items. FIG. 48 shows an example of information extraction from the HTML document of FIGS. 45 and 46 according to the template file of FIG. 47. This example is based on that the application program 3 specifies or selects "jockey," "winhorse," and "racename" as search items.

FIGS. 42, 49 to 52 show a modification of the third embodiment. The template file of FIG. 42 of the third embodiment contains the first and second tables that are partial structures consisting of the same elements for the same HTML document. Here, the partial structure is data group related to one subject such as table, list and clause. On the other hand, the modification extracts required information item by item by employing a template file that contains items having different attributes for the same HTML document, or a template file that contains partial structures having different elements for the same HTML document, or a template file that is applicable for an HTML document including link information.

FIGS. 49 and 50 show examples of displays on a Web browser of HTML documents showing shop information. These HTML documents have each three tables having same structures. FIG. 51 shows an HTML description corresponding to the HTML document of FIG. 49, and FIG. 52 shows an HTML description corresponding to the HTML document of FIG. 50. FIG. 42 shows a template file for extracting information item by item from the HTML documents of FIGS. 49 to 52. The template file of FIG. 42 contains "TableEndDelimiter" to indicate the end of a partial structure such as a table, list or a clause, the names of items to be extracted in words, data types of the items in words, and a text extraction specifying part "HtmlTemplate." For example, TableEndDelimiter=</TABLE> indicates that an appearance of </TABLE> specifies the end of a partial structure.

<A HREF="./html_2.html"> in FIG. 51 indicates a link to the HTML document of FIG. 52. The template analysis unit 1341 analyzes this link information. According to the link information and "NextURL" in the template file of FIG. 42, the template processing unit 1343 extracts information not only from the items of the HTML document of FIG. 49 but also from the items of the HTML document of FIG. 50.

First and second tables in the HTML description of FIG. 51 are two partial structures having the same document structure and the same data types. According to the descriptions about the first and second structures in the template file of FIG. 42, the template processing unit 1343 extracts item data in the partial structures having the same structure in the same HTML document. The HTML description of FIG. 52 has the same structure as that of FIG. 51, and therefore, information is extracted item by item therefrom according to the template file of FIG. 42.

The first and second tables in the HTML document of FIG. 51 are two partial structures having different attributes, in particular, presentation attribute. Among information pieces in an item "Genre" in the HTML document of FIG. 51, some are delimited with <I> and </I> and some are not. The tag "/I" indicates to display a corresponding information piece in italic. A tag "/B" indicates to display a corresponding information piece in bold. In the template file of FIG. 42, these information for different attributes are defined with two descriptions, which are applied to one line of a corresponding partial structure of the HTML documents. If a given HTML document agrees with one of the descriptions, item information is extracted from corresponding the HTML document. In FIG. 42, an omission tag ". ." is used for the item "Genre" to extract information pieces from the item without regard to the presentation attribute thereof.

In FIG. 51, a third table is a partial structure having an element "Evaluation" that is not in the first and second tables. A description about the third table in FIG. 53 enables the template processing unit 1343 to extract partial structures having different elements in the same HTML document.

As explained above, the third embodiment manages data about information contained in plural HTML documents, extracts information item by item from the HTML documents according to the data, and provides a user with required information in a unified form such as a table. The third embodiment prepares a text extraction specifying part to specify mere items from which information must be extracted according to a user's request, thereby making the formation and maintenance of the retrieval system easier. The third embodiment retrieves information item by item from HTML documents scattering over open networks without regard to varying interfaces attached to the HTML documents, and provides each user with required information in a required form.

The third embodiment employs template files that are independent of HTML syntax rules, to extract required information item by item from HTML documents, if the HTML documents have items delimited with, for example, tags. The third embodiment extracts information item by item from HTML documents only by preparing template files that define the items from which information is extracted. The template files can easily be prepared according to target HTML documents and are visually understandable. Consequently, the third embodiment easily and flexibly extracts information item by item from HTML documents.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for retrieving data contained in a plurality of semi-structured documents item by item over open networks, comprising:
   (a) a unit for storing meta data referred for describing item information of each semi-structured document containing location data about the location of each of the semi-structured documents, document structure data about the structure of each of the semi-structured documents, used to delimit document into items to be extracted, data attribute data about the data attributes of each of the items to be extracted, used to conditionally retrieve the items, and style conversion data that contains item presentation styles of user and each semi-structured document and conversion function used to convert item presentation styles of the search item described in query from user and item presentation styles of the search item described in query for the semi-structured documents from one into another;
   (b) a unit for finding, according to the location data, the location of a semi-structured document that contains all search items specified in an entered query that consists of the search items and search conditions;
   (c) a unit for converting item presentation styles of the entered query into item presentation styles of the search item in location found semi-structured documents according to the style conversion data, and forming queries for the location found semi-structured documents by referring the conversion function, if needed;
   (d) a unit for transmitting the queries provided by the unit (c) to the found locations and acquiring the semi-structured documents;
   (e) a unit for extracting item data from the acquired semi-structured documents according to the document structure data, selecting the extracted item data, if necessary, according to the attribute data for the search condition, and preparing a search result;
   (f) a unit for converting item presentation styles of the search result into the item presentation styles of each user according to the style conversion data by referring the conversion function, if needed; and
   (g) a unit for outputting converted search result in prescribed display format for each user.

2. The apparatus of claim 1, further comprising:
   (h) a unit for storing, for each of the semi-structured documents, a template that stipulates at least item name to be extracted and prescribed text extraction style data of item group to be extracted according to the document structure data,
      wherein the unit (e) compares the acquired semi-structured document with corresponding templates by scanning the acquired semi-structured document; and
      extracts item data of the items matching the text extraction style data of the template so as to prepare the search result,
      wherein the template describes variable name corresponding to each item data, and any template that is for a target semi-structured document having a plurality of partial structures contains text extraction style data for each of the partial structures; and
      the unit (e) extracts the item data so as to prepare the search result for each of the partial structures.

3. The apparatus of claim 1, wherein:
   the unit (e) shapes the search result into a table.

4. The apparatus of claim 2, wherein, if the text extraction style data of a given template includes link data to another semi-structured document,:
   the unit (e) scans a linked semi-structured document and compares the linked semi-structured document with the template.

5. The apparatus of claim 2, wherein:
   the template contains a plurality pieces of text extraction style data each of which corresponds to different tag for each of partial structures, the text extraction style data being used for filtering portions having uneven document structure data contained in the partial structure; and
   the unit (e) extracts item data of the data matching the text extraction style data, by scanning the acquired semi-structured document, when the partial structure of the semi-structured document match any one piece of the text extraction style data.

6. The apparatus of claim 2, wherein:
   the template contains a plurality pieces of text extraction style data for each of partial structures, the text extraction style data being used for filtering uneven parts contained in the partial structure; and
   the unit (e) extracts item data of the matching the text extraction style data, by scanning the acquired semi-structured document, when the partial structure of the semi-structured document match any one piece of the text extraction style data.

7. The apparatus of claim 2, wherein:

any template that is for a semi-structured document having a plurality of partial structures containing mutually different elements contains text extraction style data for each of the partial structures; and the unit (e) extracts the item data so as to prepare the search result for each of the partial structures.

8. An apparatus for retrieving data through search engines over open networks, comprising:

(aa) a unit for storing location data about the location of each search engine, essential input item data specifying essential input items required by an input form of each search engine, document structure data about the structure of each HTML document, used to delimit document into items to be extracted, item attribute data indicating whether each item is obtainable and conditionally designable in each search engine, data attribute data about the data attributes of the items to be extracted, used to conditionally retrieve the items, and style conversion data that contains item presentation styles of user and each HTML document and conversion function used to convert item presentation styles of the search item described in query from user and item presentation styles of the search item described in query for the HTML documents from one into another;

(bb) a unit for finding, according to the location data, the location of a search engine that contains all search items specified in an entered query from user that consists of the search items and search conditions;

(cc) a unit for selecting, according to the essential input item data, search engine to be searched from among the location found search engines, the search engine of which the essential input item satisfy the specified search item, by comparing the essential input item in each search engine with designated item in the inputted query;

(dd) a unit for determining an optimum retrieval pattern for each of the selected search engines according to a matrix table and converting the entered query into queries for the selected search engines accordingly, the matrix table defining combination between the inputted search items and search conditions and the item attribute data;

(ee) a unit for converting, if necessary, item presentation styles of the queries provided by the unit (dd) into item presentation styles of the search item in selected search engines according to the style conversion data;

(ff) a unit for transmitting the queries provided by the unit (ee) to the found locations and acquiring HTML documents;

(gg) a unit for extracting item data from the acquired HTML document serving as a first search result according to the structure data, selecting item data that agrees with the search condition from the extracted item data according to the search condition and the data attribute data on the basis of corresponding retrieval pattern at least with respect to an item for which conditional search is not carried out in search engine, and preparing a second search result;

(hh) a unit for converting, if necessary, item presentation styles of the second search result into item presentation styles of each user according to the style conversion data; and (ii) a unit for outputting converted second search result in prescribed format for each user that inputs query.

9. The apparatus of claim 8, further comprising:

(jj) a unit for storing, for each of the semi-structured documents, a template that stipulates at least item name to be extracted and prescribed text extraction style data of item group to be extracted according to the document structure data, wherein the unit (gg) compares the acquired semi-structured document with corresponding templates by scanning the acquired semi-structured document; and extracts item data of the items matching the text extraction style data of the template so as to preparing the search result, wherein the template describes a variable name corresponding to each item data, and any template that is for a target semi-structured document having a plurality of partial structures contains text extraction style data for each of the partial structures; and the unit (gg) extracts the item data so as to prepare the search result for each of the partial structures.

10. The apparatus of claim 8, wherein:

the unit (gg) shapes the search result into a table.

11. The apparatus of claim 9, wherein, if the text extraction style data of a given template includes link data to another HTML document, the unit (gg) scans a linked HTML document and compares the linked HTML document with the template.

12. The apparatus of claim 9, wherein:

any template that is for an HTML document having a plurality of partial structures of the same structure contains text extraction style data for each of the partial structures; and the unit (gg) extracts the item data so as to prepare the search result for each of the partial structures.

13. The apparatus of claim 9, wherein:

the template contains a plurality pieces of text extraction style data each of which corresponds to different tag for each of partial structures, the text extraction style data being used for filtering portions having uneven document structure data contained in the partial structure; and the unit (e) extracts item data of the data matching the text extraction style data, by scanning the acquired semi-structured document, when the partial structure of the semi-structured document match any one piece of the text extraction style data.

14. The apparatus of claim 9, wherein:

any template that is for an HTML document having a plurality of partial structures containing mutually different elements contains text extraction style data for each of the partial structures; and the unit (gg) extracts the item data so as to prepare the search result for each of the partial structures.

15. A method of retrieving data contained in a plurality of semi-structured documents over open networks, comprising the steps of:

(a) storing meta data referred for describing item information of each semi-structured document containing location data about the location of each of the semi-structured documents, document structure data about the structure of each of the semi-structured documents, used to delimit document into items to be extracted, data attribute data about the data attributes of each of the items to be extracted, used to conditionally retrieve the items, and style conversion data that contains item presentation styles of user and each semi-structured document and conversion function used to convert item presentation styles of the search item described in query from user and item presentation styles of the search item described in query for the semi-structured documents from one into another;

(b) finding, according to the location data, the location of a semi-structured document that contains all search items specified in an entered query that consists of the search items and search conditions;

(c) converting item presentation styles of the entered query into item presentation styles of the search item in location found semi-structured documents according to the style conversion data, and forming queries for the location found semi-structured documents by referring the function, if needed;

(d) transmitting the queries provided by the unit (c) to the found locations and acquiring the semi-structured documents;

(e) extracting item data from the acquired semi-structured documents according to the document structure data, selecting the extracted item data, if necessary, according to the attribute data for the search condition, and preparing a search result;

(f) converting item presentation styles of the search result into the item presentation styles of each user according to the style conversion data by referring the function, if needed, and (g) outputting converted search result in prescribed format for each user that inputs query.

16. A method of retrieving data through search engines over open net works, comprising the steps of:

(aa) storing location data about the location of each search engine, essential input item data specify essential in-put items required by an input form of each search engine, document structure data about the structure of each HTML document, used to delimit document into items to be extracted, item-attribute data indicating whether each item is obtainable and conditionally designable in each search engine, data attribute data about the data attributes of the items to be extracted, used to conditionally retrieve the items, and style conversion data that contains item presentation styles of user and each HTML document and conversion function used to convert item presentation styles of the search item described in query from user and item presentation styles of the search item described in query for the HTML documents from one into another;

(bb) finding, according to the location data, the location of a search engine that contains all search items specified in an entered query from user that consists of the search items and search conditions;

(cc) selecting, according to the essential input item data, search engine to be searched from among the location found search engines, the search engine of which the essential input item satisfy the specified search item, by comparing the essential input item in each search engine with designated item in the inputted query;

(dd) determining an optimum retrieval pattern for each of the selected search engines according to a matrix table and converting the entered query into queries for the selected search engines accordingly, the matrix table defining combination between the inputted search items and search conditions and the item attribute data;

(ee) converting, if necessary, item presentation styles of the queries provided by the step (dd) into item presentation styles of the search item in selected search engines according to the style conversion data;

(ff) transmitting the queries provided by the step (ee) to the found locations and acquiring HTML documents;

(gg) extracting item data from the acquired HTML document serving as a first search result according to the structure data, selecting item data that agrees with the search condition from the extracted item data according to the search condition and the data attribute data on the basis of corresponding retrieval pattern at least with respect to any item for which conditional search is not carried out in search engine, and preparing a second search result;

(hh) converting, if necessary, item presentation styles of the second search result into item presentation styles of each user according to the style conversion data; and (ii) outputting converted second search result in prescribed format for each user that inputs query.

17. A computer readable recording medium recording a program for causing the computer to execute processing for retrieving data involved in a plurality of semi-structured documents over open networks, the processing including:

(a) a process for storing meta data referred for describing item information of each semi-structured document containing location data about the location of each of the semi-structured documents, document structure data about the structure of each of the semi-structured documents, used to delimit document into items to be extracted, data attribute data about the data attributes of each of the items to be extracted, used to conditionally retrieve the items, and style conversion data that contains item presentation styles of user and each semi-structured document and conversion function used to convert item presentation styles of the search item described in query from user and item presentation styles of the search item described in query for the semi-structured documents from one into another;

(b) a process for finding, according to the location data, the location of a semi-structured document that contains all search items specified in an entered query that consists of the search items and search conditions;

(c) a process for converting item presentation styles of the entered query into item presentation styles of the search item in location found semi-structured documents according to the style conversion data, and forming queries for the location found semi-structured documents by referring the function, if needed;

(d) a process for transmitting the queries provided by the unit (c) to the found locations and acquiring the semi-structured documents;

(e) a process for extracting item data from the acquired semi-structured documents according to the document structure data, selecting the extracted item data, if necessary, according to the attribute data for the search condition, and preparing a search result;

(f) a process for converting item presentation styles of the search result into the item presentation styles of each user according to the style conversion data by referring the function, if needed, and (g) a process for outputting converted search result in prescribed format for each user that inputs query.

18. The apparatus of claim 17, further comprising:

(h) a process for storing. for each of the semi-structured documents, a template that stipulates at least item name to be extracted and prescribed text extraction style data of item group to be extracted according to the document structure data, wherein the process (e) compares the acquired semi-structured document with corresponding templates by scanning the acquired semi-structured document; and extracts item data of the items matching the text extraction style data of the template so as to prepare the search result, wherein the template describes a variable name corresponding to each item data, and any template that is for a target semi-structured document having a plurality of partial structures contains text extraction style data for each of the partial structures; and the process (e) extracts the item data so as to prepare the search result for each of the partial structures.

19. The apparatus of claim 17, wherein:

the process (e) shapes the search result into a table.

20. The apparatus of claim 18, wherein, if the text extraction style data of a given template includes link data to another semi-structured document:

the process (e) scans a linked semi-structured document and compares the linked semi-structured document with the template.

21. The recording medium of claim 18, wherein:

any template that is for a semi-structured document having a plurality of partial structures of the same structure contains text extraction style data for each of the partial structures; and the process (d) extracts the item data so as to prepare the search result for each of the partial structures.

22. The apparatus of claim 18, wherein:

the template contains a plurality pieces of text extraction style data each of which corresponds to different tag for each of partial structures, the text extraction style data being used for filtering portions having uneven document structure data contained in the partial structure; and the process (e) extracts item data of the data matching the text extraction style data, by scanning the acquired semi-structured document, when the partial structure of the semi-structured document match any one piece of the text extraction style data.

23. The apparatus of claim 18, wherein:

any template that is for a semi-structured document having a plurality of partial structures containing mutually different elements contains text extraction style data for each of the partial structures; and the process (e) extracts the item data so as to prepare the search result for each of the partial structures.

24. A computer readable recording medium recording a program for causing the computer to execute processing for retrieve data through search engines over open networks, the processing including:

(aa) a process for storing location data about the location of each search engine, essential input item data specifying essential input items required by an input form of each search engine, document structure data about the structure of each HTML document, used to delimit document into items to be extracted, item attribute data indicating whether each item is obtainable and conditionally designable in each search engine, data attribute data about the data attributes of the items to be extracted, used to conditionally retrieve the items, and style conversion data that contains item presentation styles of user and each HTML document and conversion function used to convert item presentation styles of the search item described in query from user and item presentation styles of the search item described in query for the HTML documents from one into another;

(bb) a process for finding, according to the location data, the location of a search engine that contains all search items specified in an entered query from user that consists of the search items and search conditions;

(cc) a process for selecting, according to the essential input item data, search engine to be searched from among the location found search engines, the search engine of which the essential input item satisfy the specified search item, by comparing the essential input item in each search engine with designated item in the inputted query;

(dd) a process for determining an optimum retrieval pattern for each of the selected search engines according to a matrix table and converting the entered query into queries for the selected search engines accordingly, the matrix table defining combination between the inputted search items and search conditions and the item attribute data;

(ee) a process for converting, if necessary, item presentation styles of the queries provided by the process (ee) into item presentation styles of the search item in selected search engines according to the style conversion data;

(ff) a process for transmitting the queries provided by the process (ee) to the found locations and acquiring HTML documents;

(gg) a process for extracting item data from the acquired HTML document serving as a first search result according to the structure data, selecting item data that agrees with the search condition from the extracted item data according to the search condition and the data attribute data on the basis of corresponding retrieval pattern at least with respect to item for which conditional search is not carried out in search engine, and preparing a second search result;

(hh) a process for converting, if necessary, item presentation styles of the second search result into item presentation styles of each user according to the style conversion data; and (ii) a process for outputting converted second search result in prescribed format for each user that inputs query.

25. The apparatus of claim 24, further comprising:

(jj) a process for storing, for each of the semi-structured documents, a template that stipulates at least item name to be extracted and prescribed text extraction style data of item group to be extracted according to the document structure data, wherein the process (gg) compares the acquired semi-structured document with corresponding template by scanning the acquired semi-structured document; and extracts item data of the items matching the text extraction style data of the template so as to preparing the search result, wherein the template describes a variable name corresponding to each item data, and any template that is for a target semi-structured document having a plurality of partial structures contains text extraction style data for each of the partial structures; and the process (gg) extracts the item data so as to prepare the search result for each of the partial structures.

26. The recording medium of claim 25, wherein:

the process (gg) shapes the search result into a table.

27. The recording medium of claim 25, wherein, if the text extraction style data of a given template includes link data to another HTML document, the process (gg) scans a linked HTML document and compares the linked HTML document with the template.

28. The recording medium of claim 25, wherein:

any template that is for an HTML document having a plurality of partial structures of the same structure contains text extraction style data for each of the partial a structures; and the process (ff) extracts the item data so as to prepare the search result for each of the partial structures.

29. The recording medium of claim 25, wherein:

the template contains a plurality pieces of text extraction style data each of which corresponds to different tag for each of partial structures, the text extraction style data being used for filtering portions having uneven document structure data contained in the partial structure; and the process (gg) extracts item data of the data matching the text extraction style data, by scanning the acquired semi-structured document, when the partial structure of the semi-structured document match any one piece of the text extraction style data.

30. The recording medium of claim 25, wherein:

any template that is for an HTML document having a plurality of partial structures containing mutually different elements contains text extraction style data for each of the partial structures; and the process (gg) extracts the item data so as to prepare the search result for each of the partial structures.

* * * * *